(12) United States Patent
Lankalapalli et al.

(10) Patent No.: US 11,874,101 B2
(45) Date of Patent: Jan. 16, 2024

(54) MODULAR SERVO CARTRIDGES FOR PRECISION METROLOGY

(71) Applicant: FARO Technologies, Inc., Lake Mary, FL (US)

(72) Inventors: Kishore Lankalapalli, Sanford, FL (US); John Lucas Creachbaum, Deltona, FL (US); Dragos M. Stanescu, Lake Mary, FL (US); Alessandro Patrioli, Rezzato (IT)

(73) Assignee: FARO TECHNOLOGIES, INC, Lake Mary, FL (US)

( * ) Notice: Subject to any disclaimer, the term of this patent is extended or adjusted under 35 U.S.C. 154(b) by 1295 days.

(21) Appl. No.: 16/400,635

(22) Filed: May 1, 2019

(65) Prior Publication Data

US 2019/0316899 A1 Oct. 17, 2019

Related U.S. Application Data

(63) Continuation-in-part of application No. 16/364,474, filed on Mar. 26, 2019, now Pat. No. 10,969,760.

(60) Provisional application No. 62/816,457, filed on Mar. 11, 2019, provisional application No. 62/714,861, filed on Aug. 6, 2018, provisional application No. 62/666,969, filed on May 4, 2018, provisional application No. 62/656,477, filed on Apr. 12, 2018.

(51) Int. Cl.
| | |
|---|---|
| *G01B 11/25* | (2006.01) |
| *G01B 5/008* | (2006.01) |
| *G05D 3/20* | (2006.01) |
| *G06T 7/60* | (2017.01) |

(52) U.S. Cl.
CPC ............ *G01B 11/254* (2013.01); *G01B 5/008* (2013.01); *G05D 3/20* (2013.01); *G06T 7/60* (2013.01); *G06T 2200/04* (2013.01); *G06T 2207/10012* (2013.01); *G06T 2207/30036* (2013.01)

(58) Field of Classification Search
CPC ..... G01B 5/0002; G01B 5/008; G01B 11/254
See application file for complete search history.

(56) References Cited

U.S. PATENT DOCUMENTS

| | | | |
|---|---|---|---|
| 4,534,006 | A | 8/1985 | Minucciani et al. |
| 4,836,742 | A | 6/1989 | Ishiguro et al. |
| 4,880,992 | A | 11/1989 | Niedermayr et al. |
| 4,888,877 | A | 12/1989 | Enderle et al. |

(Continued)

FOREIGN PATENT DOCUMENTS

| | | |
|---|---|---|
| EP | 2384851 A1 | 11/2011 |
| EP | 2977715 P | 1/2016 |
| WO | 2015188187 A1 | 12/2015 |

OTHER PUBLICATIONS

Extended European Search Report for Application No. 20161760.2 dated Aug. 4, 2020; 7 pgs.

(Continued)

*Primary Examiner* — Ricky Go

(74) *Attorney, Agent, or Firm* — McCarter & English, LLP

(57) ABSTRACT

Motorized cartridges and coordinate measuring machines having motorized cartridges are provided. The motorized cartridges include a cartridge housing having a shaft passing therethrough, a measurement probe coupled to shaft and arranged to detect movement of the shaft, and an integrated motor operably coupled to the shaft and arranged to drive movement of the shaft.

23 Claims, 21 Drawing Sheets

(56) References Cited

U.S. PATENT DOCUMENTS

| | | | |
|---|---|---|---|
| 5,134,782 A | 8/1992 | Breyer et al. | |
| 5,197,846 A | 3/1993 | Uno et al. | |
| 5,204,824 A | 4/1993 | Fujimaki | |
| 5,313,563 A | 5/1994 | Hara | |
| 5,402,582 A | 4/1995 | Raab | |
| 5,412,880 A | 5/1995 | Raab | |
| 5,539,975 A | 7/1996 | Kukuljan et al. | |
| 5,611,147 A | 3/1997 | Raab | |
| 5,724,264 A | 3/1998 | Rosenberg et al. | |
| 5,758,429 A | 6/1998 | Farzan et al. | |
| 6,134,506 A | 10/2000 | Rosenberg et al. | |
| 6,511,035 B1 | 1/2003 | Teel et al. | |
| 6,775,586 B2 | 8/2004 | Shibata et al. | |
| 7,054,775 B2 | 5/2006 | Rosenberg et al. | |
| 7,152,456 B2 | 12/2006 | Eaton | |
| 7,366,637 B2 | 4/2008 | Goto et al. | |
| 7,395,606 B2 | 7/2008 | Crampton | |
| 7,578,069 B2 | 8/2009 | Eaton | |
| 7,591,078 B2 | 9/2009 | Crampton | |
| 7,706,007 B2 | 4/2010 | Crawford et al. | |
| 7,847,502 B2 | 12/2010 | Iwashita et al. | |
| 7,954,250 B2 | 6/2011 | Crampton | |
| 8,214,074 B2 | 7/2012 | Mies et al. | |
| 8,340,820 B2 | 12/2012 | Nair | |
| 8,695,447 B2 | 4/2014 | Crampton | |
| 8,701,298 B2 | 4/2014 | Jordil et al. | |
| 8,705,012 B2 | 4/2014 | Greiner et al. | |
| 9,222,769 B2 | 12/2015 | Garvey et al. | |
| 9,639,401 B1 | 5/2017 | Bertram et al. | |
| 9,734,609 B2 | 8/2017 | Pulla et al. | |
| 9,964,398 B2 | 5/2018 | Becker et al. | |
| 9,977,839 B2 | 5/2018 | Czompo | |
| 10,060,857 B1 | 8/2018 | Bouchard et al. | |
| 10,126,109 B2 | 11/2018 | Tait | |
| 10,144,125 B2 | 12/2018 | Su et al. | |
| 10,288,422 B2 | 5/2019 | Uhl et al. | |
| 10,589,394 B2 | 3/2020 | Wanner et al. | |
| 10,830,618 B2 | 11/2020 | Batten et al. | |
| 10,977,454 B2 | 4/2021 | Kataoka et al. | |
| 11,113,955 B2 | 9/2021 | Maehata | |
| 11,240,404 B2 | 2/2022 | Bangs et al. | |
| 2002/0053893 A1* | 5/2002 | Khairallah | B25J 9/08 318/568.1 |
| 2003/0020906 A1* | 1/2003 | Li | G01B 11/002 356/244 |
| 2004/0162700 A1 | 8/2004 | Rosenberg et al. | |
| 2005/0111725 A1 | 5/2005 | Noda et al. | |
| 2006/0227350 A1 | 10/2006 | Crawford et al. | |
| 2006/0266100 A1 | 11/2006 | McMurtry et al. | |
| 2007/0118329 A1 | 5/2007 | Goto et al. | |
| 2008/0271332 A1 | 11/2008 | Jordil et al. | |
| 2009/0000136 A1 | 1/2009 | Crampton | |
| 2009/0033271 A1 | 2/2009 | Hon et al. | |
| 2010/0138006 A1 | 6/2010 | Mies et al. | |
| 2010/0188034 A1 | 7/2010 | Young et al. | |
| 2010/0332209 A1 | 12/2010 | Casteres et al. | |
| 2011/0258867 A1 | 10/2011 | McDonnell et al. | |
| 2011/0277534 A1 | 11/2011 | McMurtry et al. | |
| 2012/0017455 A1 | 1/2012 | Fujimoto | |
| 2012/0150354 A1 | 6/2012 | Rogers et al. | |
| 2012/0239194 A1* | 9/2012 | Kagawa | B25J 9/1692 700/254 |
| 2012/0279338 A1 | 11/2012 | Ihrke et al. | |
| 2013/0047004 A1 | 2/2013 | Hwang | |
| 2013/0116817 A1 | 5/2013 | Faughnan, Jr. et al. | |
| 2013/0253871 A1 | 9/2013 | Gray | |
| 2013/0286196 A1 | 10/2013 | Atwell | |
| 2014/0109419 A1 | 4/2014 | Shindo et al. | |
| 2014/0317942 A1 | 10/2014 | Sagemueller et al. | |
| 2015/0052768 A1 | 2/2015 | Wimmer | |
| 2015/0185000 A1 | 7/2015 | Wilson et al. | |
| 2015/0185054 A1 | 7/2015 | Hesch et al. | |
| 2016/0005331 A1* | 1/2016 | Ryland | F16H 1/12 434/118 |
| 2016/0036916 A1 | 2/2016 | Takeda et al. | |
| 2016/0195869 A1 | 7/2016 | Sagemueller et al. | |
| 2016/0265912 A1 | 9/2016 | Yasuno | |
| 2016/0305777 A1 | 10/2016 | Racine et al. | |
| 2016/0313114 A1 | 10/2016 | Tohme et al. | |
| 2017/0028557 A1 | 2/2017 | Battisti | |
| 2017/0041897 A1 | 2/2017 | Pitigoi-Aron et al. | |
| 2017/0266806 A1* | 9/2017 | Radin | B25J 9/126 |
| 2017/0276472 A1 | 9/2017 | Becker et al. | |
| 2017/0278759 A1 | 9/2017 | Sukegawa et al. | |
| 2017/0283084 A1 | 10/2017 | Gang et al. | |
| 2017/0363403 A1 | 12/2017 | Jonas | |
| 2017/0365164 A1 | 12/2017 | Maehata | |
| 2018/0095174 A1 | 4/2018 | Mertz | |
| 2018/0149457 A1 | 5/2018 | Masuta | |
| 2018/0169813 A1 | 6/2018 | Wanner et al. | |
| 2018/0203432 A1 | 7/2018 | Walker et al. | |
| 2018/0216923 A1 | 8/2018 | Creachbaum et al. | |
| 2018/0257238 A1 | 9/2018 | Hashimoto et al. | |
| 2018/0283858 A1 | 10/2018 | Uhl et al. | |
| 2018/0299247 A1 | 10/2018 | Honda et al. | |
| 2018/0321980 A1 | 11/2018 | Lo et al. | |
| 2019/0034223 A1 | 1/2019 | Yang | |
| 2019/0105774 A1 | 4/2019 | Oyama et al. | |
| 2019/0111534 A1 | 4/2019 | Ishii et al. | |
| 2019/0143523 A1 | 5/2019 | Harel et al. | |
| 2019/0247970 A1 | 8/2019 | Ishii et al. | |
| 2019/0268003 A1 | 8/2019 | Loinaz | |
| 2019/0269470 A1* | 9/2019 | Barbagli | A61B 34/20 |
| 2019/0286857 A1 | 9/2019 | Kataoka et al. | |
| 2019/0293402 A1 | 9/2019 | Kiyotani et al. | |
| 2019/0293416 A1 | 9/2019 | Novakovic et al. | |
| 2019/0317470 A1 | 10/2019 | Lankalapalli et al. | |
| 2020/0137705 A1 | 4/2020 | Takeda et al. | |
| 2020/0153527 A1 | 5/2020 | Matsunaga et al. | |
| 2021/0383133 A1 | 12/2021 | Wang et al. | |
| 2022/0236252 A1 | 7/2022 | Hayter et al. | |

OTHER PUBLICATIONS

"Agilent 4-axis Direct Drive Robot", Youtube video by j0ndrums, available at: https://www.youtube.com/watch?v=q8iVuyYsnng, accessed Apr. 13, 2018; 2 pages.

"File:HarmonicDriveAni.gif", Wikipedia, Retrieved from the Internet Sep. 14, 2018: [https://en.wikipedia.org/wiki/File:HarmonicDriveAni.gif] Published Dec. 5, 2016; 6 pages.

"The Mobile CNC Measurement and 3D Scanning System", Wenzel Scantec, Oct. 2010; 8 pages.

"UCC2 universal CMM controller", Renishaw, Installation Guide, 2008 (86 pages).

Bradley, Michael "Robotic arm joint", YouTube Video, Retrieved via internet Sep. 14, 2018 [https://www.youtube.com/watch?v=Z1tBqWnBKZY] Published Sep. 3, 2013; 2 pages.

"EMS Benelux supplier from Wenzel Mobilescan 3d scanner", Youtube video by wenzelbenelux, published on May 18, 2011, available at: https://www.youtube.com/watch?v=hf7xTv48sMU, accessed Apr. 20, 2018; 2 pages.

"Introducing KINOVA Gen3 Ultra lightweight robot", Brochure, Kinova inc, 2018, 5 pages.

\* cited by examiner

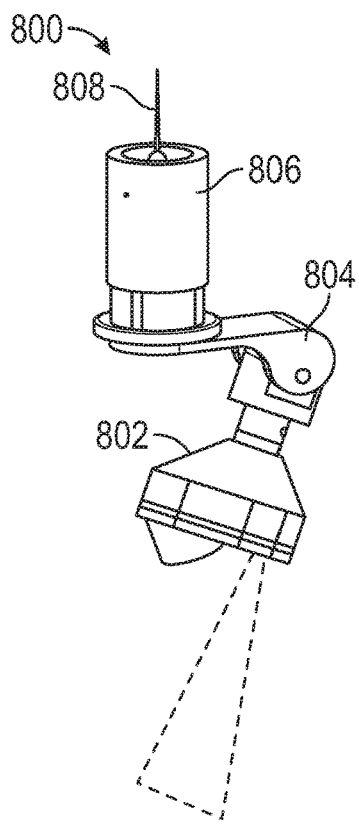
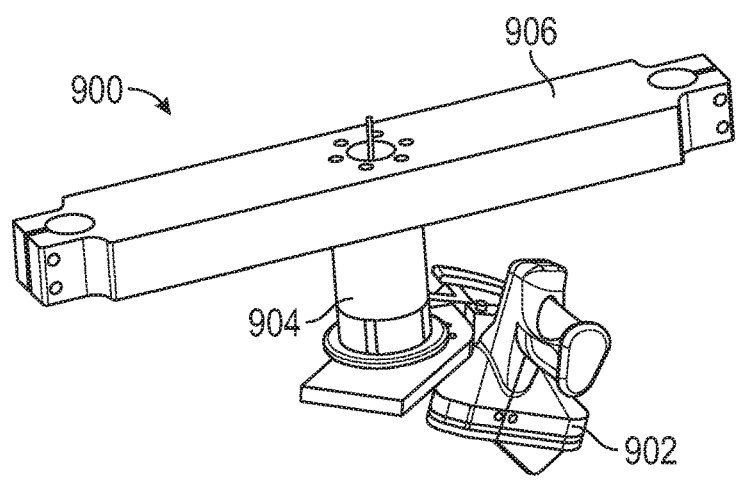
FIG. 8
FIG. 9
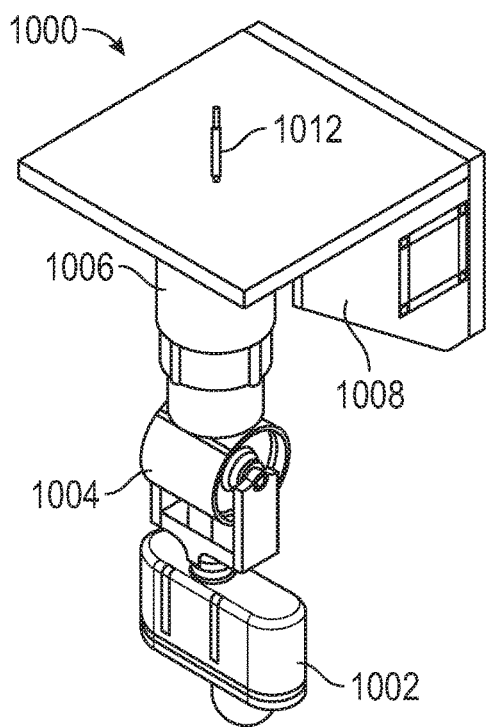
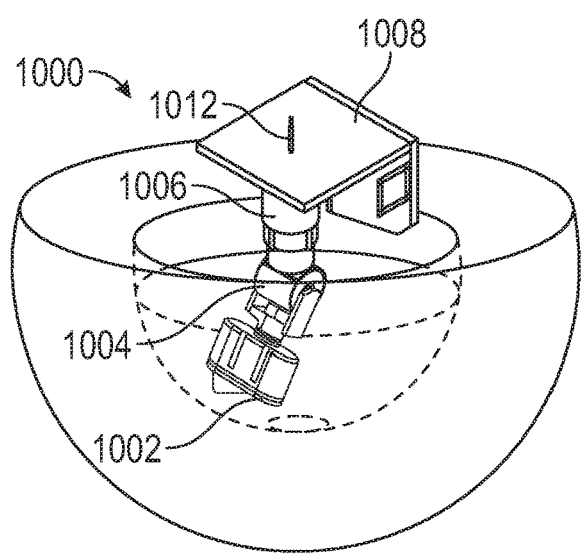
FIG. 10A
FIG. 10B

MODULAR SERVO CARTRIDGES FOR PRECISION METROLOGY

CROSS REFERENCE TO RELATED APPLICATIONS

This application claims the benefit of U.S. Provisional Application Ser. No. 62/816,457 filed Mar. 11, 2019, and U.S. Provisional Application Ser. No. 62/666,969 filed May 4, 2018, and is a Continuation-in-Part of U.S. application Ser. No. 16/364,474 filed Mar. 26, 2019, which claims the benefit of U.S. Provisional Application Ser. No. 62/656,477 filed Apr. 12, 2018 and U.S. Provisional Application Ser. No. 62/714,861 filed Aug. 6, 2018, the entire disclosures of which are incorporated herein by reference.

BACKGROUND

The present disclosure relates to coordinate measuring systems, and in particular to modular servo cartridges for precision metrology and other coordinate measuring systems.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive, and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable AACMM is disclosed in commonly assigned U.S. Pat. No. 5,402,582 ('582), which is incorporated herein by reference in its entirety. The '582 patent discloses a 3-D measuring system comprised of a manually-operated AACMM having a support base on one end and a measurement probe at the other end. Commonly assigned U.S. Pat. No. 5,611,147 ('147), which is incorporated herein by reference in its entirety, discloses a similar AACMM. In the '147 patent, the AACMM includes a number of features including an additional rotational axis at the probe end, thereby providing for an arm with either a two-two-two or a two-two-three axis configuration (the latter case being a seven axis arm).

Relative rotational movement between the arm segments of the AACMM typically involves cartridges having a pair of bearings and an angular encoder. Accordingly, while existing methods of manufacturing AACMM's are suitable for their intended purposes the need for improvement remains, particularly in providing improved measurement and scanning techniques.

BRIEF DESCRIPTION

According to some aspects of the invention, motorized cartridges for coordinate measuring machines are provided. The motorized cartridges include a cartridge housing having a shaft passing therethrough, a measurement probe coupled to shaft and arranged to detect movement of the shaft, and an integrated motor operably coupled to the shaft and arranged to drive movement of the shaft.

According to some aspects of the invention, coordinate measuring systems are provided. The coordinate measuring systems include a coordinate measuring device and a motorized cartridge having a cartridge housing having a shaft passing therethrough, a measurement probe coupled to shaft and arranged to detect movement of the shaft, and an integrated motor operably coupled to the shaft and arranged to drive movement of the shaft. The coordinate measuring device is mounted to at least one of the cartridge housing and the shaft such that movement of the shaft imparts movement to the coordinate measuring device.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 8 is a schematic illustration of a coordinate measuring system in accordance with an embodiment of the present disclosure;

FIG. 9 is a schematic illustration of a coordinate measuring system in accordance with an embodiment of the present disclosure;

FIG. 10A is a schematic illustration of a coordinate measuring system in accordance with an embodiment of the present disclosure;

FIG. 10B is an alternative view of the coordinate measuring system of FIG. 10A;

The detailed description explains embodiments of the invention, together with advantages and features, by way of example with reference to the drawings.

DETAILED DESCRIPTION

An embodiment of the present invention provides automated and/or motorized cartridges for use with coordinate measuring systems. The motorized cartridges integrate a motor into the cartridge to thus provide automation of movement of the coordinate measuring systems. Embodiments of the invention provide advantages in potentially eliminating manual operation of such coordinate measuring systems. Further, advantageously, by employing motorized cartridges of the present disclosure, learning processes can be employed to teach the motorized cartridges to control operation of coordinate measuring systems after manual input.

Figure 1A:
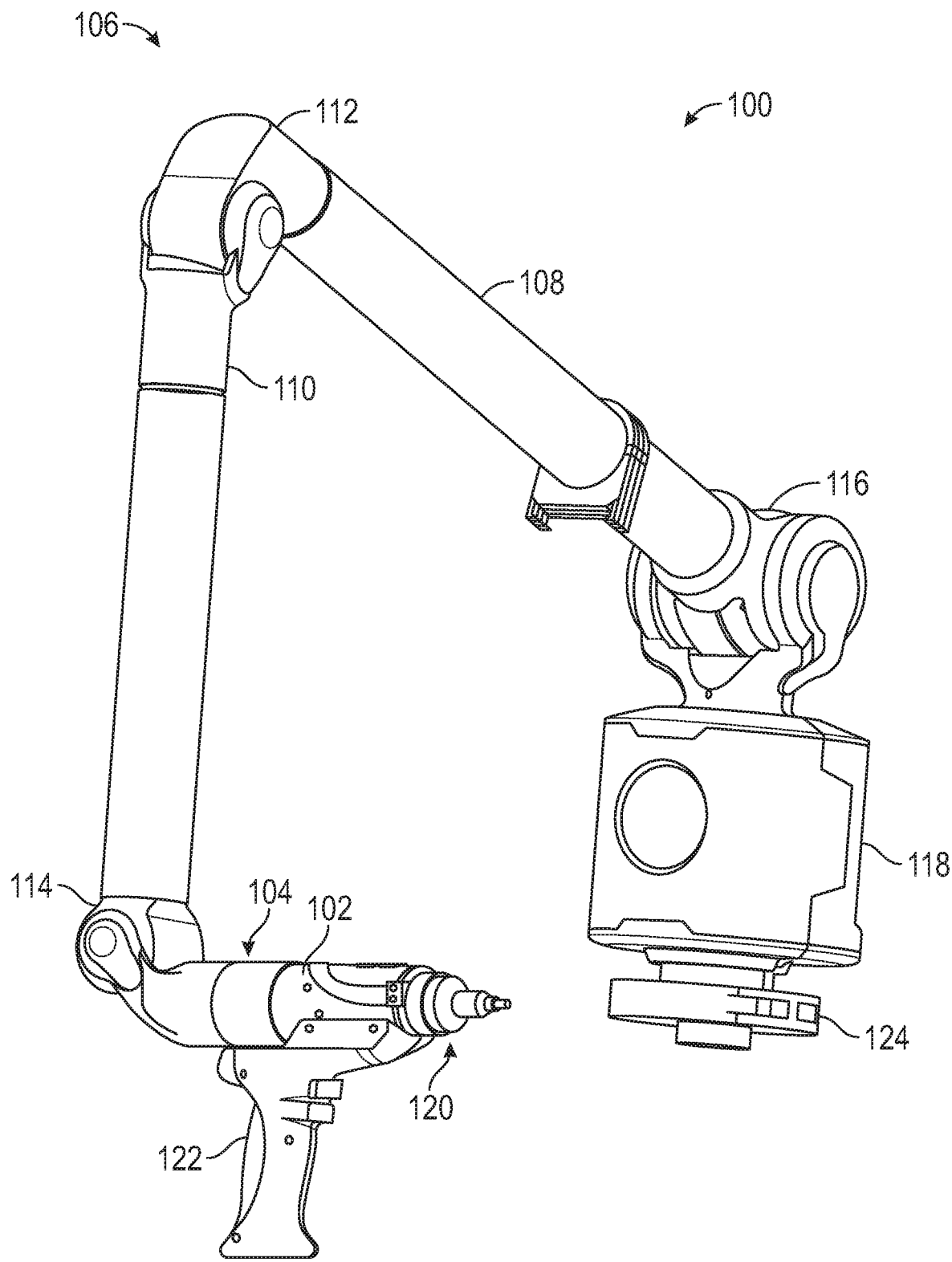
FIG. 1A is an isometric view of a portable articulated arm coordinate measuring machine (AACMM) that may incorporate embodiments of the present disclosure.
Figure 1B:
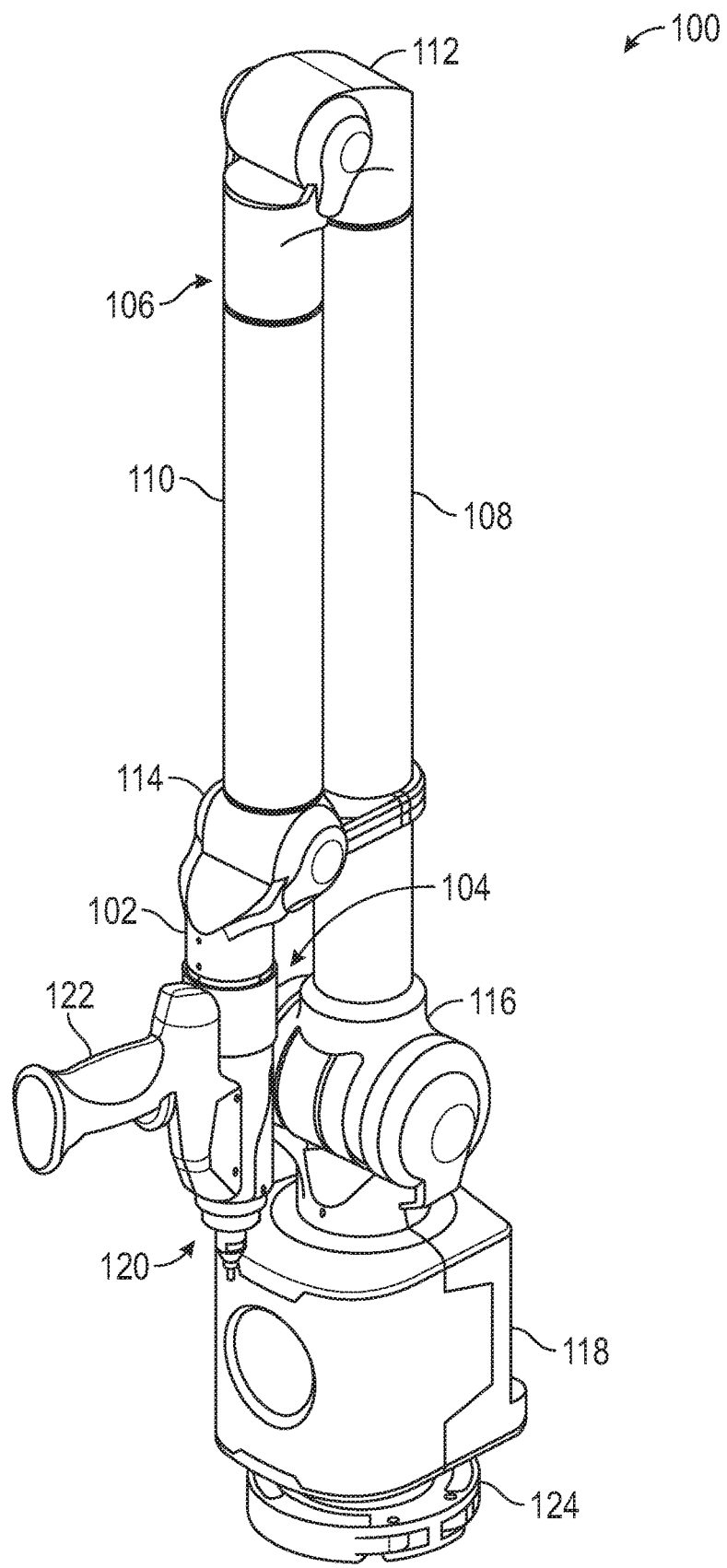
FIG. 1B is another isometric view of the portable AACMM of FIG. 1A.

FIGS. 1A and 1B illustrate, in perspective, a portable articulated arm coordinate measuring machine (AACMM) 100 that may be employed with embodiments of the present disclosure. The AACMM 100 is one type of coordinate measuring machine that can be employed with embodiments of the present disclosure, and thus the discussion and description is presented herein merely for illustrative and explanatory purposes, and the specific illustrative embodiments are not intended to be limiting.

As shown in FIGS. 1A and 1B, the AACMM 100 may comprise a six or seven axis articulated measurement device having a probe device 102 that includes a measurement probe housing 104 coupled to an arm portion 106 of the AACMM 100 at one end. The arm portion 106 comprises a first arm segment 108 coupled to a second arm segment 110 by a rotational connection having a first bearing cartridge 112 (e.g., one or more bearing cartridges). A second bearing cartridge 114 (e.g., one or more bearing cartridges) couples the second arm segment 110 to the measurement probe housing 104. A third bearing cartridge 116 (e.g., one or more bearing cartridges) couples the first arm segment 108 to a control unit 118 located at the other end of the arm portion 106 of the AACMM 100. Each of the bearing cartridges 112, 114, 116 provides for multiple axes of articulated movement. In some embodiments, the bearing cartridges 112, 114, 116 may be configured or replaced by groupings of bearing cartridges, and thus single bearing cartridge arrangements are not to be limiting. Further, the measurement probe housing 104 of the probe device 102 can include a shaft of a seventh axis portion of the AACMM 100 (e.g., a cartridge containing measurement probe or measurement probe system that determines movement of the measurement device, for example a probe 120, in the seventh axis of the AACMM 100). In this illustrative embodiment, the probe device 102 may rotate about an axis extending through the center of the measurement probe housing 104. In use of the AACMM 100, the control unit 118 is typically affixed to a work surface.

Each bearing cartridge 112, 114, 116 typically contains a measurement probe system (e.g., an optical angular measurement probe system, a touch probe system, etc.). The measurement probe system (i.e., transducer) provides an indication of the position of the respective arm segments 108, 110 and corresponding bearing cartridges 112, 114, 116 (or bearing cartridge groupings) that, all together, provide an indication of the position of the probe 120 with respect to the control unit 118 (and, thus, the position of an object being measured by the AACMM 100 in a certain frame of reference—for example a local or global frame of reference). The arm segments 108, 110 may be made from a suitably rigid material such as, but not limited to, a carbon composite material, for example. The portable AACMM 100 with six or seven axes of articulated movement (i.e., degrees of freedom) provides advantages in allowing an operator to position the probe 120 in a desired location within a 360° area about control unit base 118 while providing an arm portion 106 that may be easily handled by the operator. However, it should be appreciated that the illustration of an arm portion 106 having two arm segments 108, 110 is for exemplary purposes, and the claimed invention should not be so limited. An AACMM in accordance with embodiments of the present disclosure may have any number of arm segments coupled together by bearing cartridges (and, thus, more or less than six or seven axes of articulated movement or degrees of freedom).

As will be appreciated by those of skill in the art, each of the bearing cartridges 112, 114, 116 may optionally include one or more slip rings. The slip rings allow for the transfer of electricity (e.g., power and/or data) along the length of the arm portion 106 while still allowing each of the bearing cartridges 112, 114, 116 to rotate substantially unencumbered and independently from each other.

The probe 120 is detachably mounted to the measurement probe housing 104, which is connected to the second bearing cartridge 114. A handle 122 is removably connected or attached to the measurement probe housing 104 by way of, for example, a quick-connect interface. In the some embodiments, a quick-connect interface may include both mechanical fastening members that secure the handle 122 and/or the probe 120 to the housing 102 and electrical connections that allow a user to control the probe 120 through the handle 122 (e.g. actuation buttons) and also provide for high speed data communication between the handle 122 and/or the probe 120 and the control unit 118. In some embodiments, the handle 122 and/or the probe 120 may be replaced with another device or accessory (e.g., a laser line probe, a bar code reader), thereby providing advantages in allowing the operator to use different measurement devices with the same AACMM 100.

In some embodiments, the probe 120 may be removably attached to the measurement probe housing 104. In some embodiments, the probe 120 may be a contacting measurement device and may have different tips or ends that are arranged to enable physical contact with an object to be measured, including, but not limited to ball, touch-sensitive, curved, and extension type probes. In other embodiments, the measurement may be performed, for example, by a non-contacting device such as a laser line probe (LLP). In one example embodiment, the handle 122 may be replaced with an LLP using a quick-connect interface. Other types of accessory devices may replace the removable handle 122 to provide additional functionality. Examples of such accessory devices include, but are not limited to, one or more illumination lights, temperature sensors, thermal scanners, bar code scanners, projectors, paint sprayers, cameras, video cameras, audio recording systems, etc.

In some embodiments, such as shown in FIGS. 1A and 1B, the AACMM 100 may include a removable handle 122 attached to the measurement probe housing 104 that provides advantages in allowing accessories, devices, and/or functionality to be changed without removing the measurement probe housing 104 from the second bearing cartridge 114. As noted above, the removable handle 122 may also include one or more electrical connectors that allow electrical power and/or data to be exchanged between the handle 122 and corresponding electronics located in the probe 102 and/or the control unit 118.

In various embodiments, and as will be discussed in more detail below, each rotational connection of the AACMM 100 includes the bearing cartridges 112, 114, 116 that allow the arm portion 106 of the AACMM 100 to move about multiple axes of rotation. As mentioned, each bearing cartridge 112, 114, 116 includes a corresponding measurement probe system, such as optical angular encoders for example, that are each arranged coaxially with the corresponding axis of rotation of, e.g., the arm segments 108, 110. The measurement probe systems detect rotational (swivel) or transverse (hinge) movement of, for example, each one of the arm segments 108, 110 about a corresponding axis and transmits a signal to an electronic data processing system within the AACMM 100. In some embodiments, each individual raw encoder count may be sent separately to the electronic data processing system as a signal where it is further processed into measurement data.

The control unit 118 may include an attachment device or mounting device 124. The mounting device 124 allows the AACMM 100 to be removably mounted to a desired location, such as a base, an inspection table, a machining center, a wall, the floor, etc. In accordance with an embodiment, the control unit 118 of the portable AACMM 100 contains or houses an electronic data processing system that includes various electronic and/or processing components. For example, in one non-limiting embodiment, the control unit 118 can contain or house a processing system that processes data received from the various measurement probe systems within the AACMM 100 (e.g., within the bearing cartridges 112, 114, 116) as well as data representing other arm parameters to support three-dimensional (3-D) positional calculations and a user interface processing system that includes an on-board operating system, a touch screen display, and resident application software that allows for relatively complete metrology functions to be implemented within the AACMM 100 without the need for connection to an external computer, although such connection may be employed in some embodiments.

The electronic data processing system in the control unit 118 may communicate with the measurement probe systems, sensors, and other peripheral hardware located away from the control unit 118 (e.g., a LLP that can be mounted to or within the removable handle 122 on the AACMM 100). The electronics that support these peripheral hardware devices or features may be located in each of the bearing cartridges 112, 114, 116 located within the portable AACMM 100.

Although shown and described with respect to an articulated arm coordinate measuring machine, the present disclosure is not to be limited thereby. For example, although an arm configuration has been shown and described, various other movement/rotational device systems may incorporate embodiments described herein. That is, various types of systems, assemblies, devices, components, etc. can incorporate cartridges as described with respect to the articulated arm coordinate measuring machine of FIGS. 1A-1B, including rotatable platters, turntables, conveyor belts, rotatable imagers, etc.

Figure 2A:
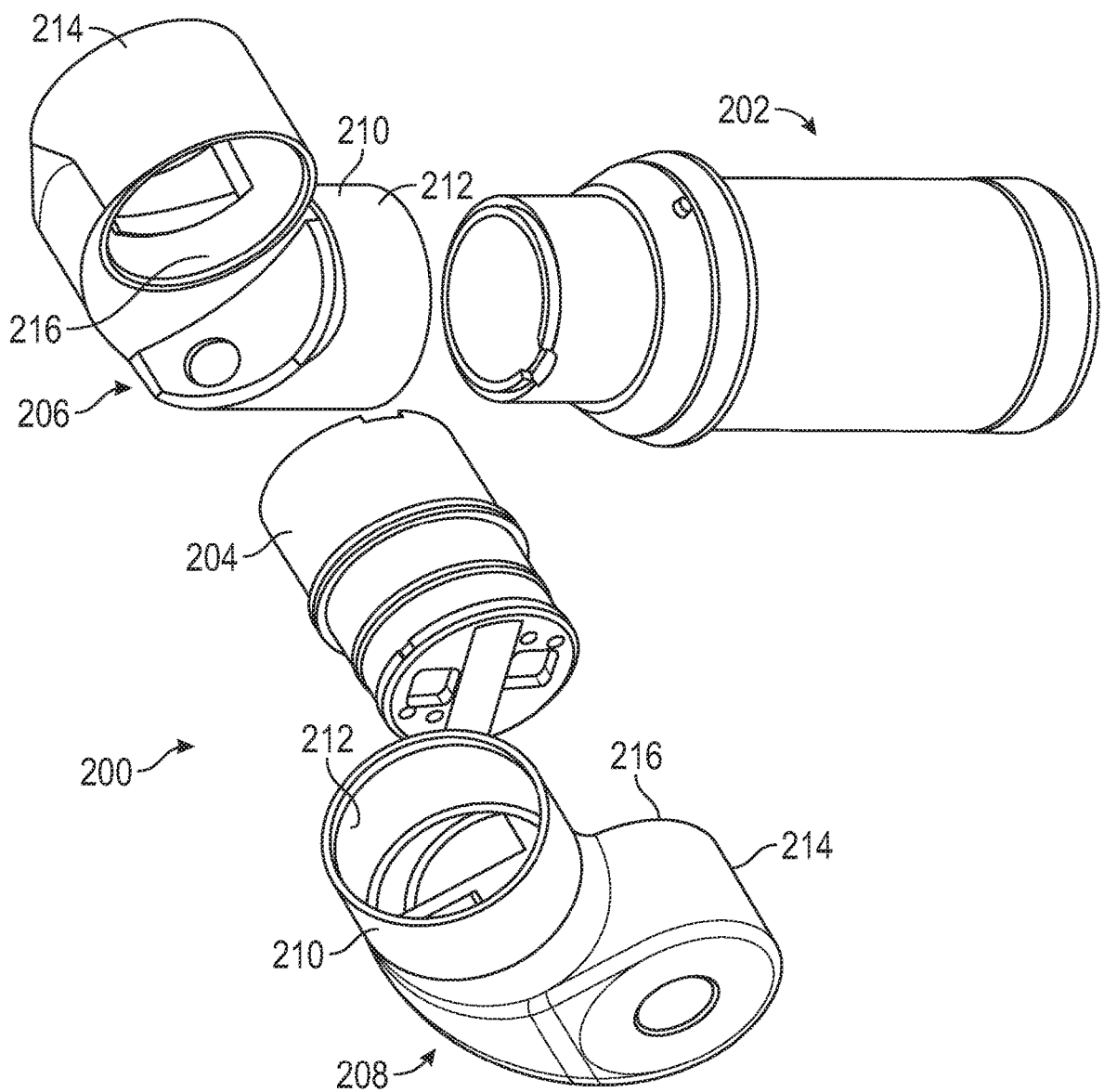
FIG. 2A is a partial exploded view illustrating a pair of encoder/bearing cartridges being assembled between two dual socket joints that can incorporate embodiments of the present disclosure.
Figure 2B:
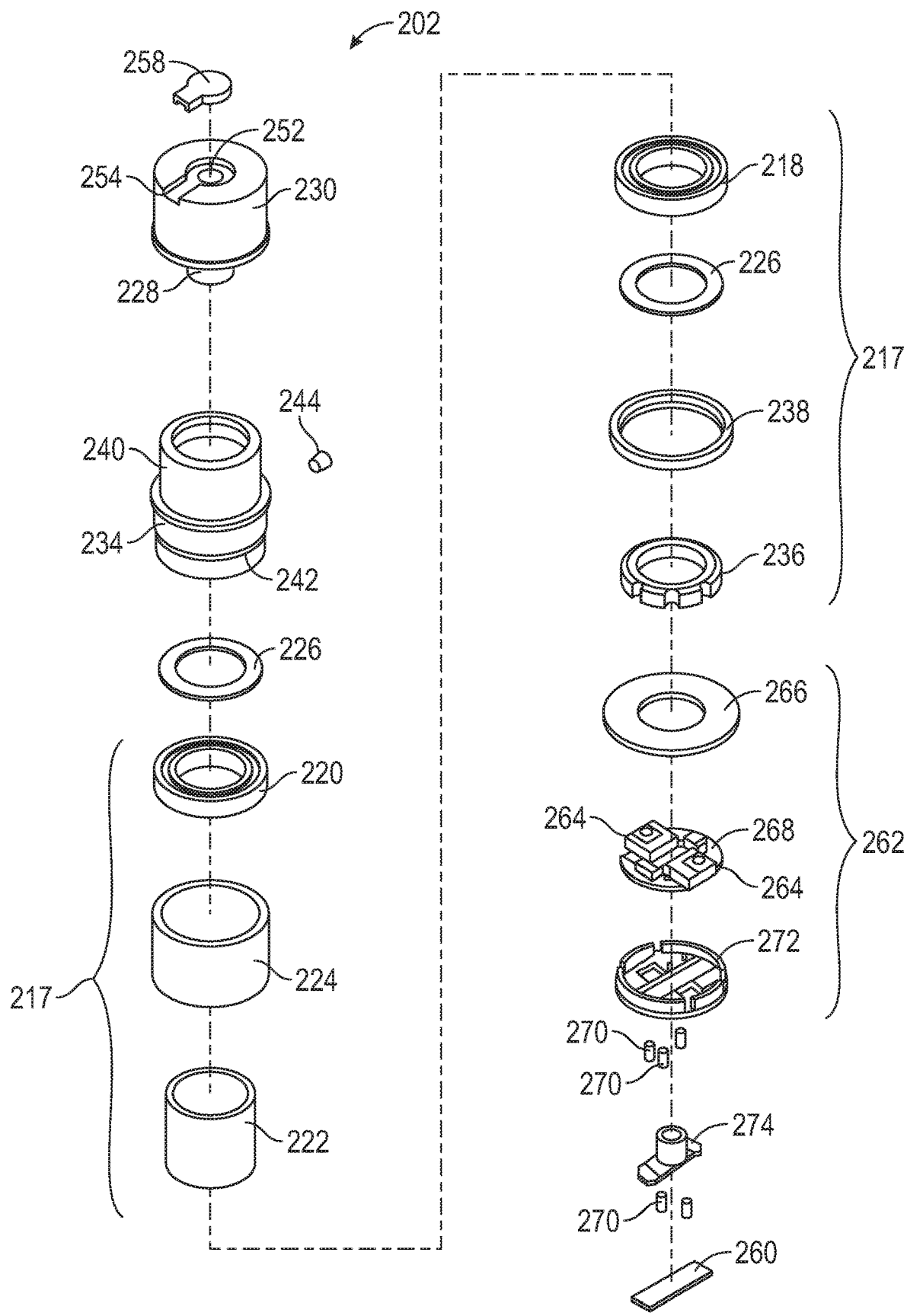
FIG. 2B is an exploded perspective view illustration of the encoder/bearing cartridge of FIG. 2A.
Figure 2C:
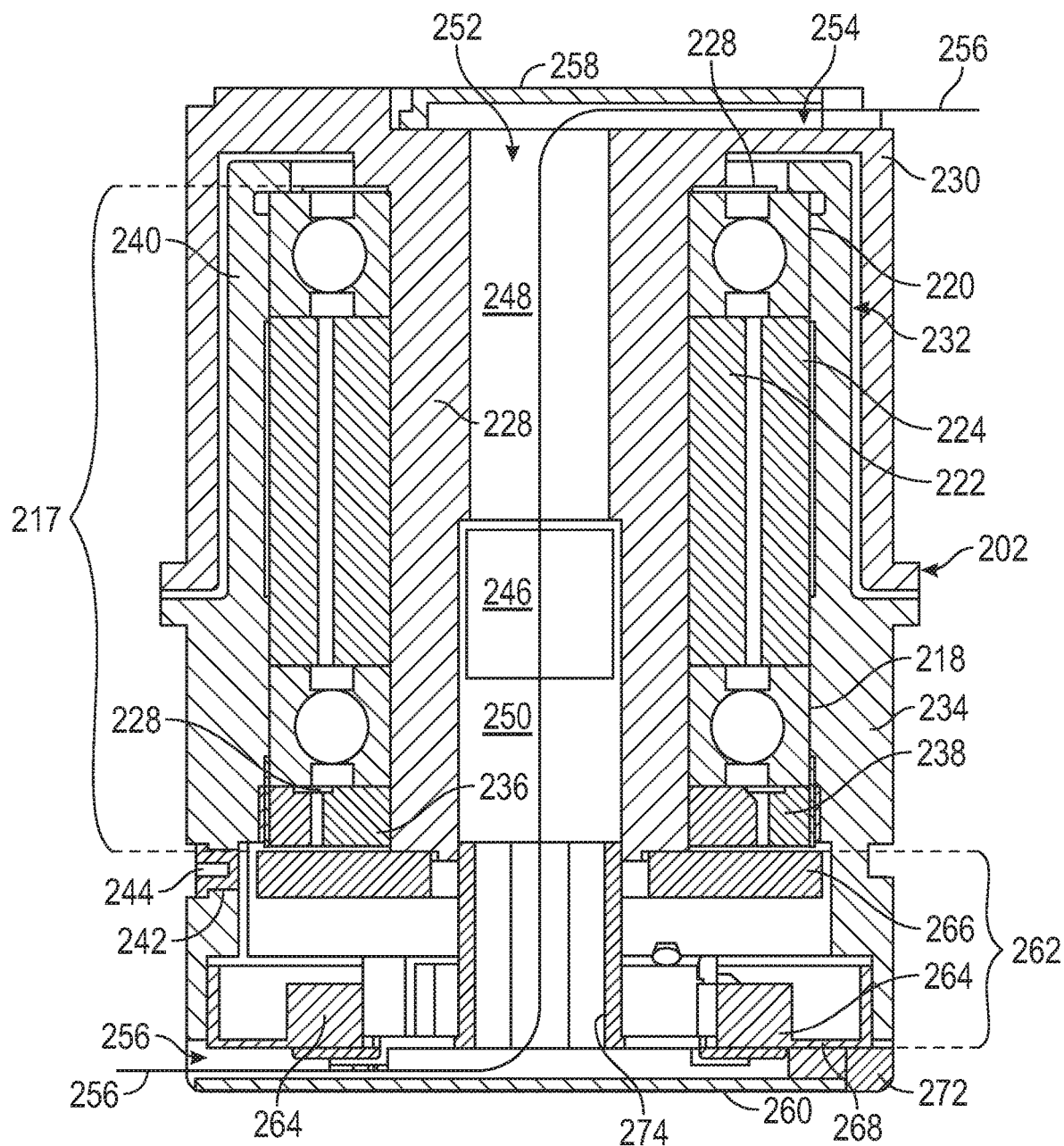
FIG. 2C is a side sectional view of the cartridge of FIG. 2A.

Turning now to FIGS. 2A-2C, schematic illustrations of a bearing cartridge group 200 that can incorporate embodiments of the present disclosure are shown. The bearing cartridge group 200 includes a first bearing cartridge 202 and a second bearing cartridge 204. The first and second bearing cartridges 202, 204 may be part of a rotational arm connection that employs groupings of bearing cartridges, such as the bearing cartridge group 200. Similar to that described above, the bearing cartridges 202, 204 may include slip ring assemblies that allow for rotation of the various arm segments without impacting electrical connection.

The rotational connections of an articulated arm can utilize a modular bearing/measurement probe cartridge such as the first bearing cartridge 202 and/or the second bearing cartridge 204. The first and second cartridges 202, 204, as shown in FIG. 2A, are mounted in openings of dual socket joints 206, 208. Each socket joint 206, 208, in this illustrative embodiment, includes a first cylindrical extension 210 having a first recess or socket 212 and a second cylindrical extension 214 having a second recess or socket 216. Generally the sockets 212, 216 are positioned 90° to one another, although other relative angular configurations may be employed.

As shown, the second cartridge 204 is engageable in each socket 216 of the socket joints 206, 208 to form a hinge joint. Further, the first cartridge 202 is engageable within the socket 212 of the socket joint 206 to define a longitudinal swivel joint. The modular bearing/measurement probe cartridges 202, 204 provide advantages in permitting separate manufacture of a pre-stressed or preloaded dual bearing cartridge on which is mounted modular encoder components. The bearing/measurement probe cartridges can then be fixedly attached to the external skeletal components, such as the dual socket joints 206, 208 of an articulated arm portion (e.g., as shown in FIGS. 1A-1B). The use of such cartridges is advantageous in permitting high-quality, high-speed production of sophisticated subcomponents of various articulated arm components.

Although shown with two cartridges, in some embodiments, there may be any number of cartridges used to form a joint. For example, in some embodiments, as many as four or more different cartridge types, for example two "long" axial cartridges that allow for swivel rotation, and two "short" cartridges that provide a hinge joint can be employed to form a joint of an articulated arm. Each cartridge includes a pre-loaded bearing arrangement and a transducer which may comprise a digital encoder. Although various geometries, shapes, sizes, lengths, etc. of the cartridges may vary, the present disclosure will describe the cartridges with respect to the first cartridge 202, with the second cartridge 204 having a similar construction.

Turning now to FIGS. 2B-2C, the first cartridge 202 includes a bearing assembly 217. The bearing assembly 217, as shown in FIGS. 2B-2C, includes a pair of bearings 218, 220 separated by an inner sleeve 222 and an outer sleeve 224. In some arrangements and embodiments, it may be desirable that the bearings 218, 220 be pre-loaded. In one non-limiting example, the preload is provided by the sleeves 222, 224 being different lengths (e.g., the inner sleeve 222 is shorter than the outer sleeve 224) so that upon tightening, a preselected preload is generated on the bearings 218, 220. The bearings 218, 220 may be sealed using seals 226 and rotatably mounted on a shaft 228.

At an upper surface or end, the shaft 228 terminates at, in, or is part of a first housing 230. An annulus 232 is defined between the shaft 228 and the first housing 230. A second housing 234 can be positioned within the annulus 232 and can position or retain the bearings 218, 220, the sleeves 222, 224, and the seals 226 about the shaft 228. As referred to herein, the bearings 218, 220, the sleeves 222, 224, and the seals 226 may form a "bearing assembly" that is housed within the first and second housings 230, 234 and arranged about the shaft 228.

The bearing assembly is positioned within the housing 230 about the shaft 228, as shown in FIGS. 2B-2C. The bearing assembly can be securely attached to the housing 230 using a combination of an inner nut 236 and an outer nut 238. In one embodiment, upon assembly, an upper portion 240 of second housing 234 may be received within the annulus 234. It should be appreciated that the aforementioned preload is provided to the bearings 218, 220 upon the tightening of the inner and outer nuts 236, 238 which provide compression forces to the bearings 218, 220 and, due to the difference in length between the sleeves 222, 224, a desired preload can be applied. It should be appreciated that while the first cartridge 202 is illustrated as having a pair of spaced bearings 218, 220, cartridges of the present disclosure may include one or more bearings, as desirable for a given application or assembly. However, it will be appreciated that each cartridge includes at least one bearing.

In accordance with some embodiments, the cartridges may have unlimited rotation. In other embodiments, the cartridges may be limited to rotation over a defined angular range. For example, as shown in FIGS. 2B-2C, limited rotation may be achieved using a shuttle-and-groove arrangement (although other arrangements may be employed without departing from the scope of the present disclosure). A groove 242 may be formed on an outer surface of the second housing 234, which provides a cylindrical track to receive a shuttle 244. The shuttle 244 rides within the groove 242 until it abuts a removable shuttle stop, such as a set screw (not shown), whereupon further rotation is precluded. The amount of rotation can vary depending on what is desired. In one non-limiting example, the shuttle rotation may be limited to less than 720 degrees of rotation. In other embodiments, the cartridge may be configured for unlimited rotation.

In some embodiments, as shown in FIG. 2C, a slip-ring assembly 246 may be used, particularly in unlimited rotation assemblies. In one embodiment, the shaft 228 has a hollow or axial opening 248 therethrough, which has a larger diameter section 250 at one end. The slip ring assembly 246 may be positioned within the larger diameter section 250 of the opening 248 of the shaft 228. The slip ring assembly 246 may consist of any commercially available slip ring. For example, in one non-limiting embodiment, the slip ring assembly 246 includes an H-series slip ring available from IDM Electronics Ltd. of Reading, Berkshire, United Kingdom. The slip ring assembly 246 is non-structural with respect to the preloaded bearing assembly. The slip ring assembly 246 provides no mechanical function but only provides electrical or signal transfer functions. A first housing aperture 252 is arranged to communicate with a first channel 254 sized and configured to receive wiring 256 from the slip ring assembly 246. A second channel 256 may be formed at an opposite end of the cartridge 202 to also receive the wiring 256. Such wiring is secured in place and protected by a first wire cover 258 and a second wire cover 260. The wire covers 258, 260 may be installed onto and received within (or define in part) the respective channels 254, 256.

As discussed herein, the first cartridge 202 (and cartridges of the present disclosure) includes both a preloaded bearing structure, as described above, and a measurement probe assembly 262, such as an encoder assembly or the like. In the illustrative embodiment, the measurement probe assembly 262 is an optical encoder, although other encoders may be employed without departing from the scope of the present disclosure. Further, in some embodiments, the measurement probe assembly may include a rotary encoder having a read head and an optical disk having index marks. The measurement probe assembly 262 includes one or more read heads 264 and a grating disk 266. In this embodiment, a pair of read heads 264 is positioned on a read head connector board 268. The connector board 268 is attached via fasteners 270 to a mounting plate 272. The grating disk 266 is attached to the lower surface of the shaft 228, for example by use of an adhesive, and is spaced apart from and in alignment with the read heads 264. A wire funnel 274 and the second wire cover 260 provide the final outer covering to the end of the cartridge 202. The wire funnel 274 captures and retains the wiring 256. It should be appreciated that the grating disk 266 of the measurement probe assembly 262 will be retained and rotate with the shaft 228. It should be further appreciated that while the illustrated embodiment shows two read heads 264, more than two read heads or a single read head may alternatively be used. Still further, in other embodiments, the positions of the read heads 264 and the grating disk 266 may be reversed whereby the read heads 264 rotate with the shaft 228.

As noted above, typically, portable articulated arm coordinate measuring machines (AACMMs) are manual, with an operator manually moving a probe or other device attached at the end of one or more articulated arms. The articulated arms include modular cartridges, as described above, that form each of the of the kinematics joints of the arm. For example, each cartridge consists of a pair of bearings between a shaft and housing, and couples with high precision encoders for position feedback. In one non-limiting example, six or seven such cartridges may be assembled together with mechanical linkages and all the necessary electronics to precisely read joint positions while articulating the arm manually. Using the position feedback, a predictive model can compute the three-dimensional position of the probe and/or points on a laser line in the case of a laser line probe.

Embodiments provided here are directed to providing servo-cartridges and/or motorized cartridges to replace the cartridges or prior assemblies. For example, embodiments add a servo motor and controller to the cartridges within the housing. Advantageously, for example, automated metrology applications can be enabled through use of motors within the cartridges.

Figure 3:
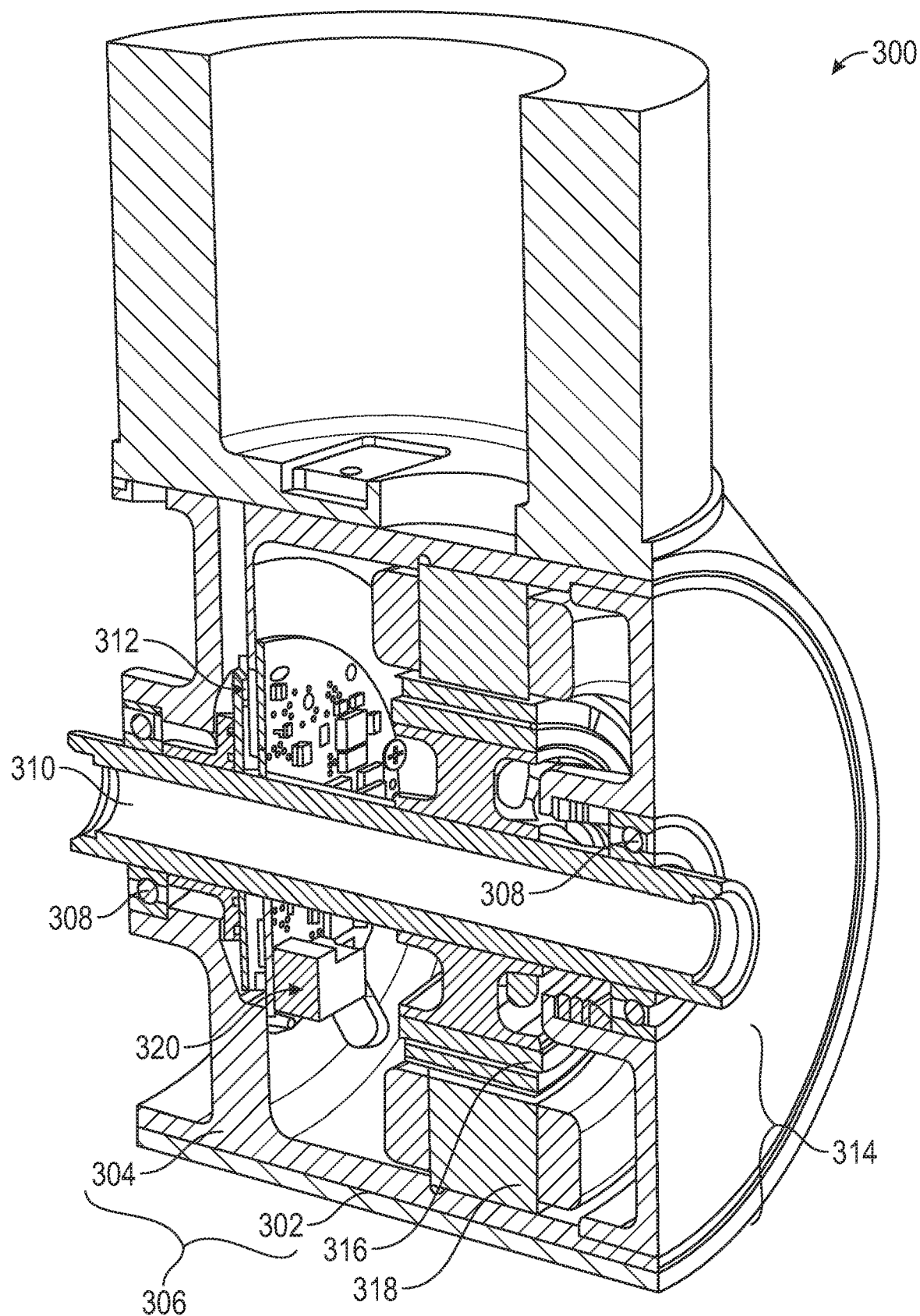
FIG. 3 is a schematic illustration of a motorized cartridge in accordance with an embodiment of the present disclosure.

Turning now to FIG. 3, a schematic illustration of a cartridge 300 in accordance with an embodiment of the present disclosure is shown. The cartridge 300 may be used in articulated arm coordinate measuring machine (AACMM), and in particular may be installed to form a joint or a part of a joint of an articulated arm. The cartridge 300 may be similar to the cartridges shown and described above, and thus the details thereof may be omitted for simplicity. However, the cartridge 300 of this embodiment is a motorized cartridge, and thus manual operation may be eliminated for moving an articulated arm of which the cartridge 300 is a part.

The cartridge 300 includes a first housing 302 and a second housing 304 forming a cartridge housing 306. A bearing assembly 308 (including bearings, seals, sleeves, etc., as needed) is installed within and/or to the cartridge housing 306. A shaft 310 is rotatable within the cartridge housing 306 and on the bearing assembly 308. The shaft 310 can be arranged to connect or attach to an arm, device, etc. (e.g., an attached device) to thus control rotation or movement of the attached device. A measurement probe assembly 312 is arranged within the cartridge housing 306 and includes at least one component attached or connected to the shaft 310 and at least one component separate therefrom, thus enabling measurement of rotation of the shaft 310 and thus enable position determination of an attached device. In some embodiments, the measurement probe assembly may include a rotary encoder having a read head and an optical disk having index marks assembled relative to the shaft 310. Although shown with the measurement probe assembly 312 located within the cartridge housing 306, in some embodiments, the measurement probe assembly 312 or parts thereof may be located external to the cartridge housing 306.

In this embodiment, located within the cartridge housing 306 is an integrated motor 314. The integrated motor 314 may be a servo motor, frameless motor, direct drive motor, etc. That is, in accordance with embodiments of the present disclosure, the integrated motor 314 does not include a gearbox or transmission, thus maintaining a light weight motor within the cartridge 300. As shown in FIG. 3, all aspects of the integrated motor 314 may be contained within the cartridge housing 306. However, as described herein, the integrated motor, or parts thereof, may be installed external to the cartridge housing, without departing from the scope of the present disclosure.

The integrated motor 314 includes a first motor component 316 and a second motor component 318. In some embodiments, the first motor component 316 may be a rotor assembly having one or more magnets (e.g., permanent magnets) that is fixedly connected to the shaft 310. The second motor component 318 may be a stator assembly (e.g., windings) that is fixedly positioned within the cartridge housing 306. An alternative arrangement of magnets fixedly positioned relative to the shaft and a windings fixedly attached to the shaft can be employed without departing from the scope of the present disclosure. It will be appreciated by those of skill in the art that there is no contact between the first and second motor components 316, 318. That is, in some embodiments, there is no physical contact or connection between the stator and rotor of the components of the motor.

Operation of the integrated motor 314 is controlled by a control unit 320, which in this embodiment is housed within the cartridge housing 306. The control unit 320 may be arranged to control an electrical current passing through a portion of the integrated motor 314 such that the integrated motor 314 is rotated. In embodiments with the first motor component 316 fixedly attached to the shaft 310, the control unit 320 may control an electrical current passing through the second motor component 318 such that the first motor component 316 is rotated relative to the second motor component 318. As the first motor component 316 is rotated, the shaft 310 is rotated, and thus any attached device will also be rotated or moved. The control unit 320, as shown, may be an integrated circuit with onboard processing and electrical control elements, although in other embodiments, the control unit may be a remote or external control unit that is electrically connected and/or otherwise in communication with the measurement probe assembly 312 or parts thereof. In some embodiments, the control unit 320 can be configured as an interface between the integrated motor 314 and an external control system, such as a computer or other electronic device. That is, in some embodiments, the control unit 320 can be arranged to receive signals from an external source to thus control the operation of the integrated motor 314. Further, in some embodiments, the control unit 320 can include memory or other storage to enable learning, as described herein, to thus further advance automation and automatic operation of the cartridge 300.

In some embodiments, a number of motorized cartridges may be arranged as parts of an articulated arm, as described above. In such embodiments, a single or multiple control units may be employed. For example, in one non-limiting example, a single control unit may be operably connected to a plurality of motorized cartridges. In some such embodiments, the control unit may be external to all motorized cartridges, or in some embodiments, the control unit may be integrated or onboard a single motorized cartridge, yet configured to control operation of multiple different motorized cartridges. In another embodiment, each motorized cartridge of a system may include an integrated or onboard control unit, and the control units may be connected or in communication (e.g., "daisy-chained") by a single serial bus. Those of skill in the art will appreciate that other control unit configurations may be employed without departing from the scope of the present disclosure.

Figure 4:
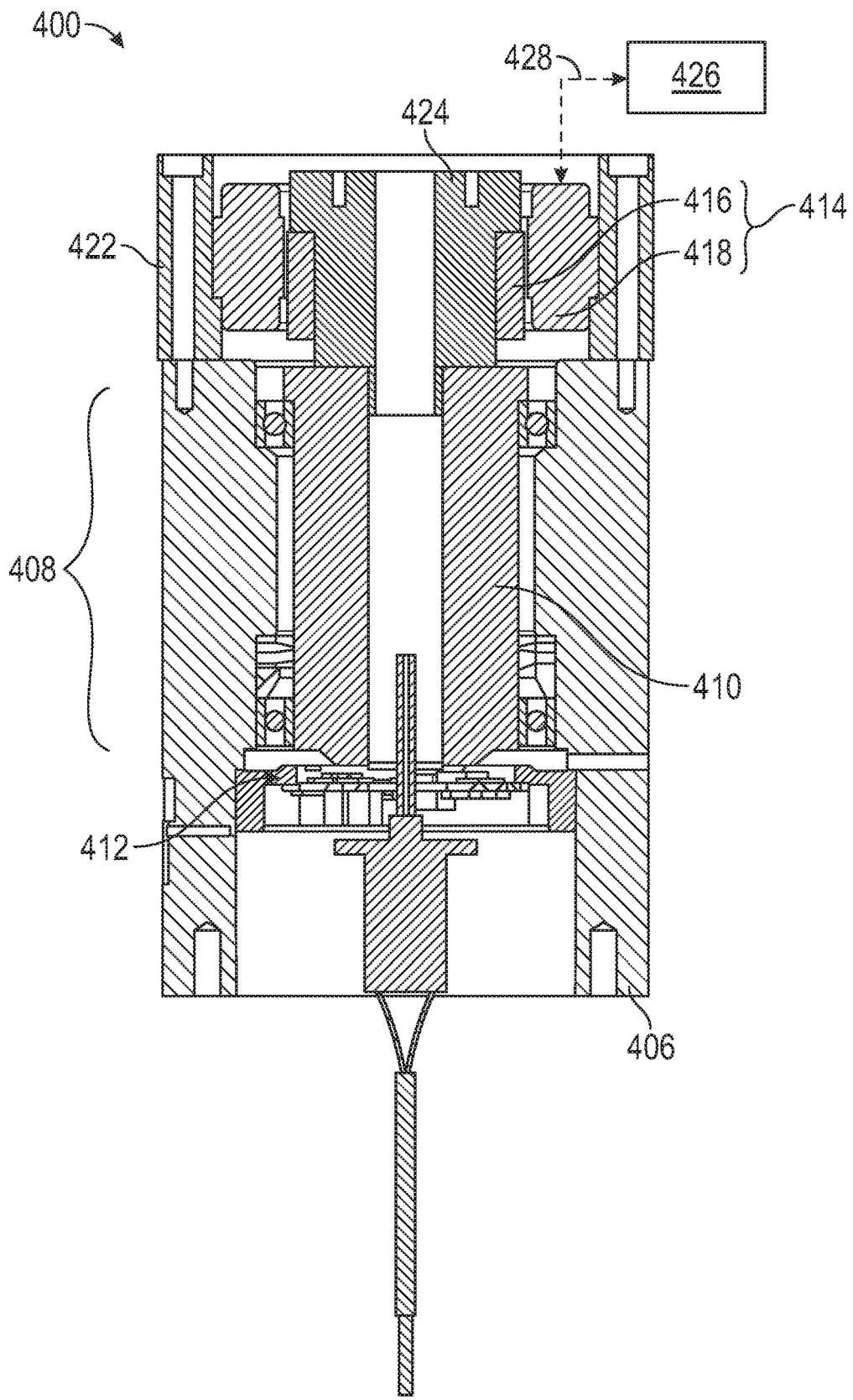
FIG. 4 is a schematic illustration of a motorized cartridge in accordance with an embodiment of the present disclosure.

Turning now to FIG. 4, a schematic illustration of a cartridge 400 in accordance with an embodiment of the present disclosure is shown. The cartridge 400 may be used in articulated arm coordinate measuring machine (AACMM), and in particular may be installed to form a joint or a part of a joint of an articulated arm. In other embodiments, the cartridge 400 may be used in a turntable or rotatable platter configuration. The cartridge 400 may be similar to the cartridges shown and described above, and thus the details thereof may be omitted for simplicity. Similar to the embodiment of FIG. 3, the cartridge 400 is a motorized cartridge.

The cartridge 400 includes a cartridge housing 406 housing a bearing assembly 408 and a shaft 410 that is rotatable within the cartridge housing 406. The shaft 410 can be arranged to connect or attach to an arm, device, platter, plate, etc. (e.g., an attached device) to thus control rotation or movement of the attached device. A measurement probe assembly 412 is arranged within the cartridge housing 406 and includes at least one component attached or connected to the shaft 410 and at least one component separate therefrom, thus enabling measurement of rotation of the shaft 410. For example, the measurement probe assembly 412 can include a rotary encoder operable to measure rotation of the shaft 410. The rotary encoder, in such embodiments, has a read head and an optical disk having index marks. Although shown with the measurement probe assembly 412 located within the cartridge housing 406, in some embodiments, the measurement probe assembly 412 or parts thereof may be located external to the cartridge housing 406.

In this embodiment, an integrated motor 414 is mounted to the cartridge housing 406, and housed within a motor housing 422. The integrated motor 414 may be a servo motor, frameless motor, direct drive motor, etc. That is, in accordance with embodiments of the present disclosure, the integrated motor 414 does not include a gearbox or transmission, thus maintaining a light weight motor to drive the shaft 410. As shown in FIG. 4, the motor housing 422 is affixed to the cartridge housing 406. An adapter 424 may be positioned within the motor housing 422 to be driven by the integrated motor 414. The adapter 424 is fixedly connected to the shaft 410 and thus rotation of the adapter 424 will rotate the shaft 410. In some embodiments, the adapter 424 and the shaft 410 may be a single body. The adapter 424 is further arranged to connect to an attached device (e.g., an arm, device, platter, plate, etc.).

The integrated motor 414 includes a first motor component 416 and a second motor component 418. The first motor component 416 may be a rotor assembly having one or more magnets (e.g., permanent magnets) that is fixedly connected to the adapter 424 and/or the shaft 410. The second motor component 418 may be a stator assembly (e.g., windings) that is fixedly positioned within the motor housing 422. Operation of the integrated motor 414 is controlled by a control unit 426, which in this embodiment is remote from the cartridge 400. The control unit 426 may be arranged to control an electrical current passing through a portion of the integrated motor 414 such that the integrated motor 414 is rotated. The control unit 426 may be an integrated circuit with onboard processing and electrical control elements, a computer, or other electronic control device/element. As shown, the control unit 426 is operably connected to the integrated motor 414 by a communications connection 428. The communications connection 428 can be wired or wireless, depending on the configuration.

Figure 5A:
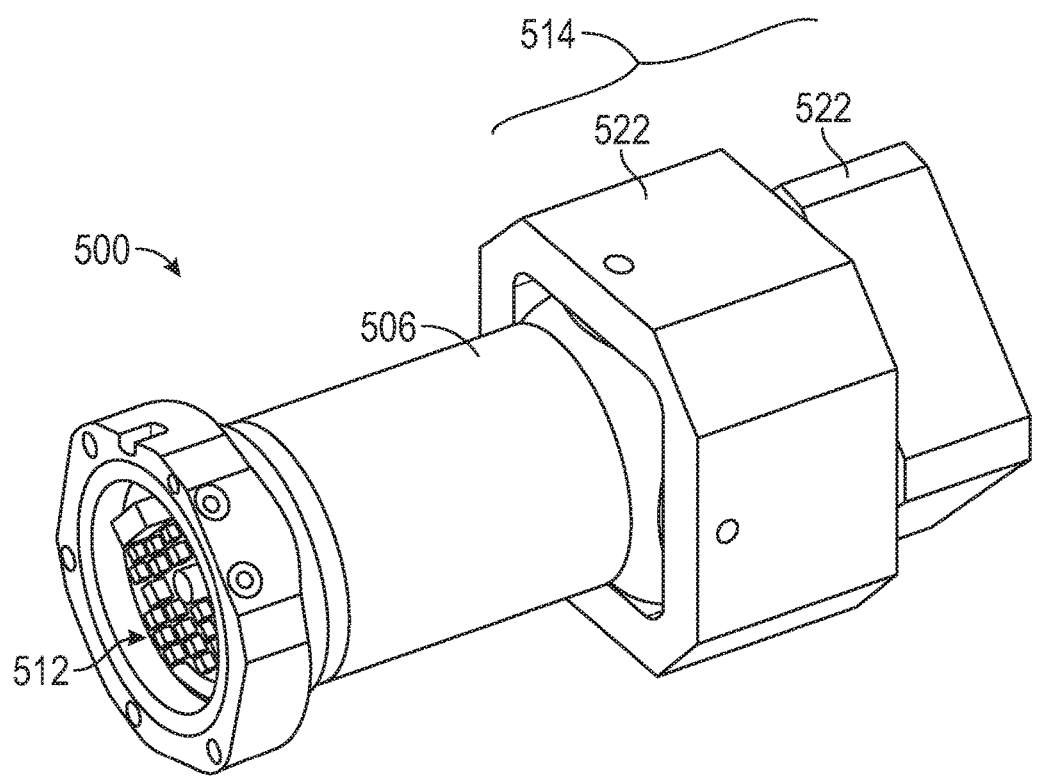
FIG. 5A is a schematic illustration of a motorized cartridge in accordance with an embodiment of the present disclosure.
Figure 5B:
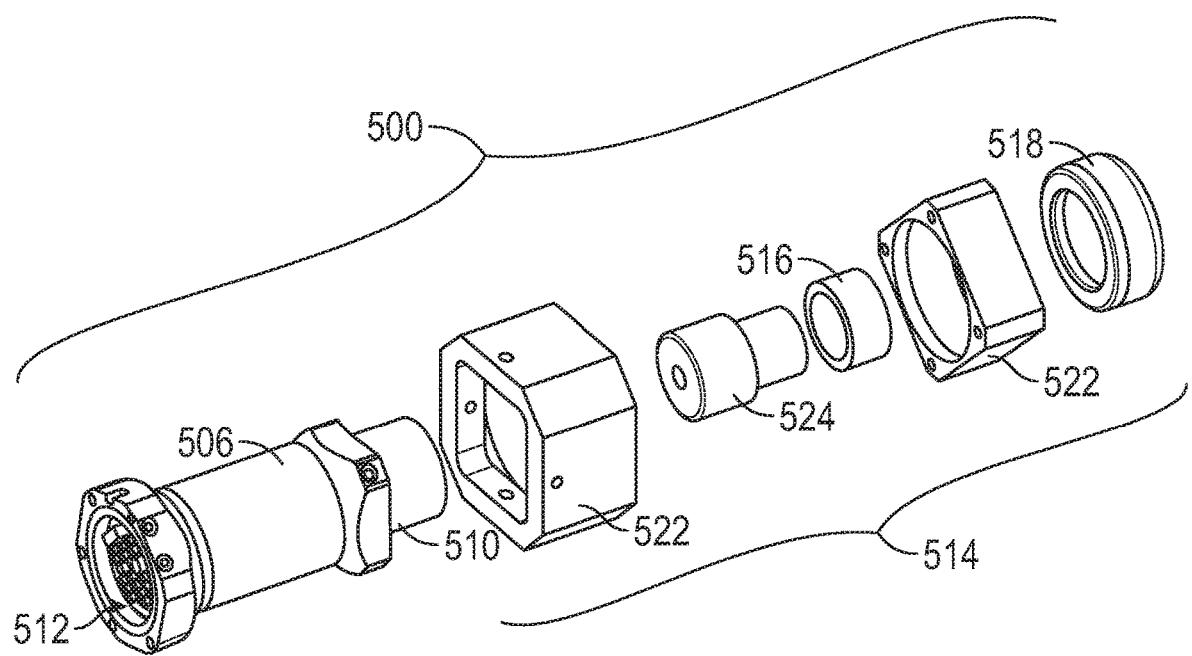
FIG. 5B is an exploded illustrative view of the motorized cartridge of FIG. 5A.

Turning now to FIGS. 5A-5B, schematic illustrations of a cartridge 500 in accordance with an embodiment of the present disclosure are shown. The cartridge 500 may be used in articulated arm coordinate measuring machine (AACMM), and in particular may be installed to form a joint or a part of a joint of an articulated arm. In other embodiments, the cartridge 500 may be used in a turntable or rotatable platter configuration. The cartridge 500 may be similar to the cartridges shown and described above, and thus the details thereof may be omitted for simplicity. Similar to the above embodiments, the cartridge 500 is a motorized cartridge.

The cartridge 500 includes a cartridge housing 506 with a bearing assembly and a shaft 510 that is rotatable within the cartridge housing 506. The shaft 510 can be arranged to connect or attach to an arm, device, platter, plate, etc. (e.g., an attached device) and/or an adapter to thus control rotation or movement of the attached device. A measurement probe assembly 512 is arranged within the cartridge housing 506 and includes at least one component attached or connected to the shaft 510 and at least one component separate therefrom, thus enabling measurement of rotation of the shaft 510. For example, the measurement probe assembly 512 can include a rotary encoder operable to measure rotation of the shaft 510. The rotary encoder, in such embodiments, has a read head and an optical disk having index marks.

In this embodiment, an integrated motor 514 is mounted to the cartridge housing 506, and housed within a motor housing 522, which in this embodiment comprises two housing parts, as illustratively shown. The integrated motor 514 may be a servo motor, frameless motor, direct drive motor, etc. That is, in accordance with embodiments of the present disclosure, the integrated motor 514 does not include a gearbox or transmission, thus maintaining a light weight motor to drive the shaft 510. As shown in FIG. 5A, the motor housing 522 is affixed to the cartridge housing 506. An adapter 524 may be positioned within the motor housing 522 to be driven by the integrated motor 514. The adapter 524 is fixedly connected to the shaft 510 and thus rotation of the adapter 524 will rotate the shaft 510. In some embodiments, the adapter 524 and the shaft 510 may be a single body. The adapter 524 and/or a portion of the motor housing 522 may be arranged to connect to an attached device (e.g., an arm, device, platter, plate, etc.) to enable rotation thereof.

The integrated motor 514 includes a first motor component 516 and a second motor component 518. The first motor component 516 may be a rotor assembly having one or more magnets (e.g., permanent magnets) that is fixedly connected to the adapter 524 and/or to the shaft 510. The second motor component 518 may be a stator assembly (e.g., windings) that is fixedly positioned within the motor housing 522. Operation of the integrated motor 514 is controlled by a control unit (not shown), for example, as described above.

Figure 6:
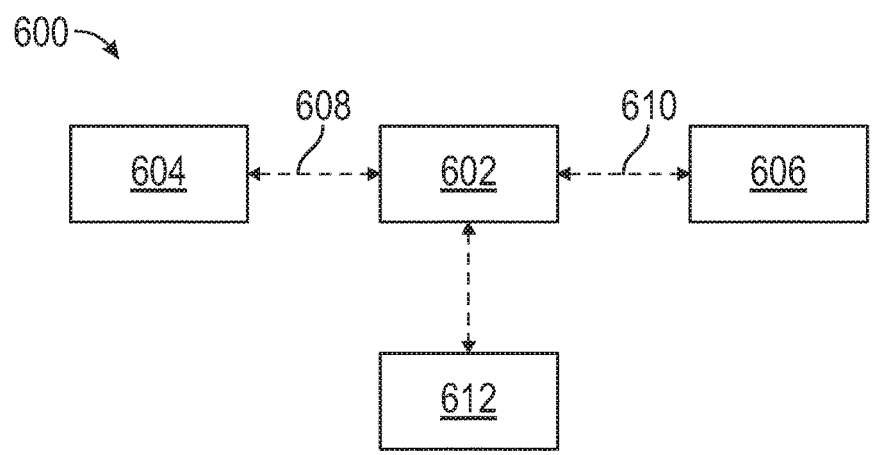
FIG. 6 is a schematic diagram of a coordinate measuring system in accordance with an embodiment of the present disclosure.

Turning now to FIG. 6, a schematic diagram of a coordinate measuring system 600 in accordance with an embodiment of the present disclosure is shown. The coordinate measuring system 600 may include various components that can incorporate one or more motorized cartridges as shown and described above. The coordinate measuring system 600 includes a control unit 602 that is operably connected, in this embodiment, to a first coordinate measuring device 604 and a second coordinate measuring device 606. The control unit 602 is configured to control operation of the first and second coordinate measuring devices 604, 606, and can transmit and receive information, commands, data, power, etc. with the first and second coordinate measuring devices 604, 606. As shown, the control unit 602 is connected to or in communication with the first coordinate measuring device 604 through a first communications connection 608 and the control unit 602 is connected to or in communication with the second coordinate measuring device 606 through a second communications connection 610. The first and second communications connections 608, 610 may be wired or wireless connections, and in some embodiments may be a bus or similar electronics connection.

In accordance with some embodiments, the control unit 602 includes one or more processors and memory. The processor(s) are configured to control methods for operating the coordinate measuring system or aspects/parts thereof (e.g., the coordinate measuring device(s)). The control methods may be stored in memory in non-transitory computer media, e.g., in the form of computer instructions, programs, applications, coding, etc. Embodiments disclosed herein may be implemented on any type of computer regardless of the platform being used. For example, a networked computer system may be employed. The networked computer system may include a processor, associated memory, a storage device, and numerous other elements and functionalities typical of computers as known in the art. The networked computer system may also include input means, such as a keyboard and a mouse, and output means, such as a monitor, display, etc. The networked computer system may be connected to a local area network (LAN) or a wide area network (e.g., the Internet) via a network interface connection. Those skilled in the art will appreciate that the input and output means may take many other forms. In some embodiments, the computer system may not be connected to a network. Further, those skilled in the art will appreciate that one or more elements of aforementioned computer system may be located at a remote location and connected to the other elements over a network. As such, a computer system, such as a networked computer system, and/or any other computer systems known in the art may be used in accordance with embodiments disclosed herein.

The first coordinate measuring device 604 can include one or more motorized cartridges as shown and described above. Similarly, the second coordinate measuring device 606 can include one or more motorized cartridges as shown and described above. In some embodiments, the control unit 602 can be arranged to control the motorized cartridges of the coordinate measuring devices 604, 606 to control movement of one or more aspects of the coordinate measuring devices 604, 606 (e.g., arms, articulated arms, platters, plates, imagers, etc.). In one non-limiting example, the first coordinate measuring device 604 may include one or more rotary or linear axis systems and associated encoders for measuring respective movement thereof (e.g., an articulated arm of an articulated arm coordinate measuring machine). Further, in one example, the second coordinate measuring device 606 may be a laser line probe that controlled to move or rotate to capture images or scans of a scanned object.

The coordinate measuring system 600 further includes a control system 612 that is operably connected to and/or in communication with the control unit 602. Although shown with the control system 612 and the control unit 602 as separate components or elements, in some embodiments, the control system 612 and the control unit 602 may be a single device or system (e.g., a computer having capability of both devices). In the present illustration, the control system 612 is arranged as a computer that is operably connected to the control unit 602, with commands or other instruction sent from the control system 612 to the control unit 602 and data or other information sent from the control unit 602 to the control system 612. The control system 612 may further be connected to the internet, servers, networks, and/or other devices as will be appreciated by those of skill in the art.

Figure 7:
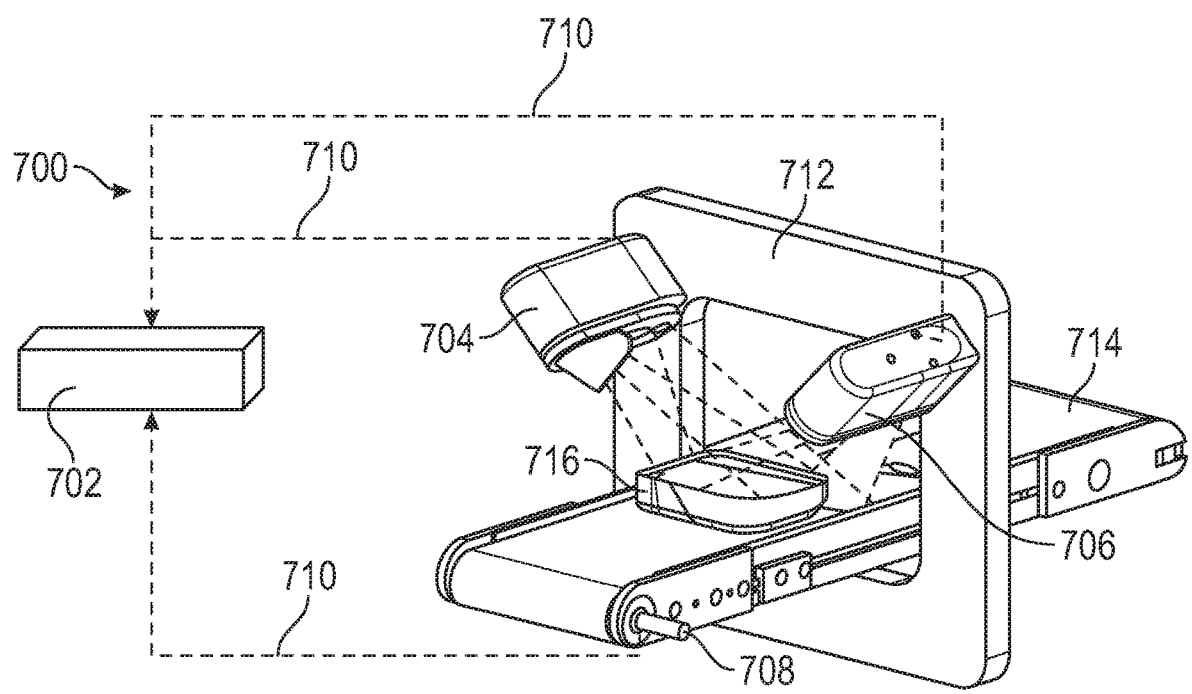
FIG. 7 is a schematic illustration of a coordinate measuring system in accordance with an embodiment of the present disclosure.

Turning now to FIG. 7, a schematic illustration of a coordinate measuring system 700 in accordance with an embodiment of the present disclosure is shown. The coordinate measuring system 700 may include various components that can incorporate one or more motorized cartridges. The coordinate measuring system 700 includes a control unit 702 that is operably connected, in this embodiment, to a first coordinate measuring device 704, a second coordinate measuring device 706, and a third coordinate measuring device 708. The control unit 702 is configured to control operation of the first, second, and third coordinate measuring devices 704, 706, 708 and can transmit and receive information, commands, data, power, etc. therebetween. As shown, the control unit 702 is connected to or in communication with the coordinate measuring devices 704, 706, 708 through communications connections 710.

In this illustrative embodiment, the first coordinate measuring device 704 is a first laser line probe mounted to a frame 712 at a first position, the second coordinate measuring device 706 is a second laser line probe mounted to the frame 712 at a second position, and the third coordinate measuring device 708 is part of a conveyor 714. A scanned object 716 can be moved on the conveyor 714 through the frame 712 and the first and second coordinate measuring devices may make measurements associated with the scanned object 716. Each of the coordinate measuring devices 704, 706, 708 can include one or more motorized cartridges, as shown and described above or variations thereon.

Turning now to FIG. 8, a schematic illustration of a coordinate measuring device 800 is shown. The coordinate measuring device 800 includes a laser line probe 802 movably mounted by a first motorized cartridge 804 and a second motorized cartridge 806. A communication connection 808 (e.g., an electrical wire) can be fed into and through the various components of the coordinate measuring device 800 to enable control of the motorized cartridges 804, 808 and the laser line probe 802. Although shown with the laser line probe 802 attached to the motorized cartridges 804, 806, various other attached devices can be used without departing from the scope of the present disclosure.

Turning now to FIG. 9, a schematic illustration of a coordinate measuring device 900 is shown. The coordinate measuring device 900 includes a laser line probe 902 movably mounted by a motorized cartridge 904 which is attached to a frame 906. A communication connection (not shown) can be fed into and through the various components of the coordinate measuring device 900 to enable control of the motorized cartridge 904 and the laser line probe 902. Although shown with the laser line probe 902 attached to the motorized cartridge 904, various other attached devices can be used without departing from the scope of the present disclosure.

Turning now to FIGS. 10A-10B, schematic illustrations of a coordinate measuring device 1000 are shown. The coordinate measuring device 1000 includes a laser line probe 1002 movably mounted by a first motorized cartridge 1004 and a second motorized cartridge 1006 which are attached to a frame 1008. A communication connection 1012 can be fed into and through the various components of the coordinate measuring device 1000 to enable control of the first and second motorized cartridges 1004, 1006 and the laser line probe 1002. Although shown with the laser line probe 1002 attached to the motorized cartridges 1004, 1006, various other attached devices can be used without departing from the scope of the present disclosure. Attached devices of the present disclosure can include, but are not limited to, triangulation scanners, image scanners, structured light scanners, and/or photogrammetry devices.

Figure 11A:
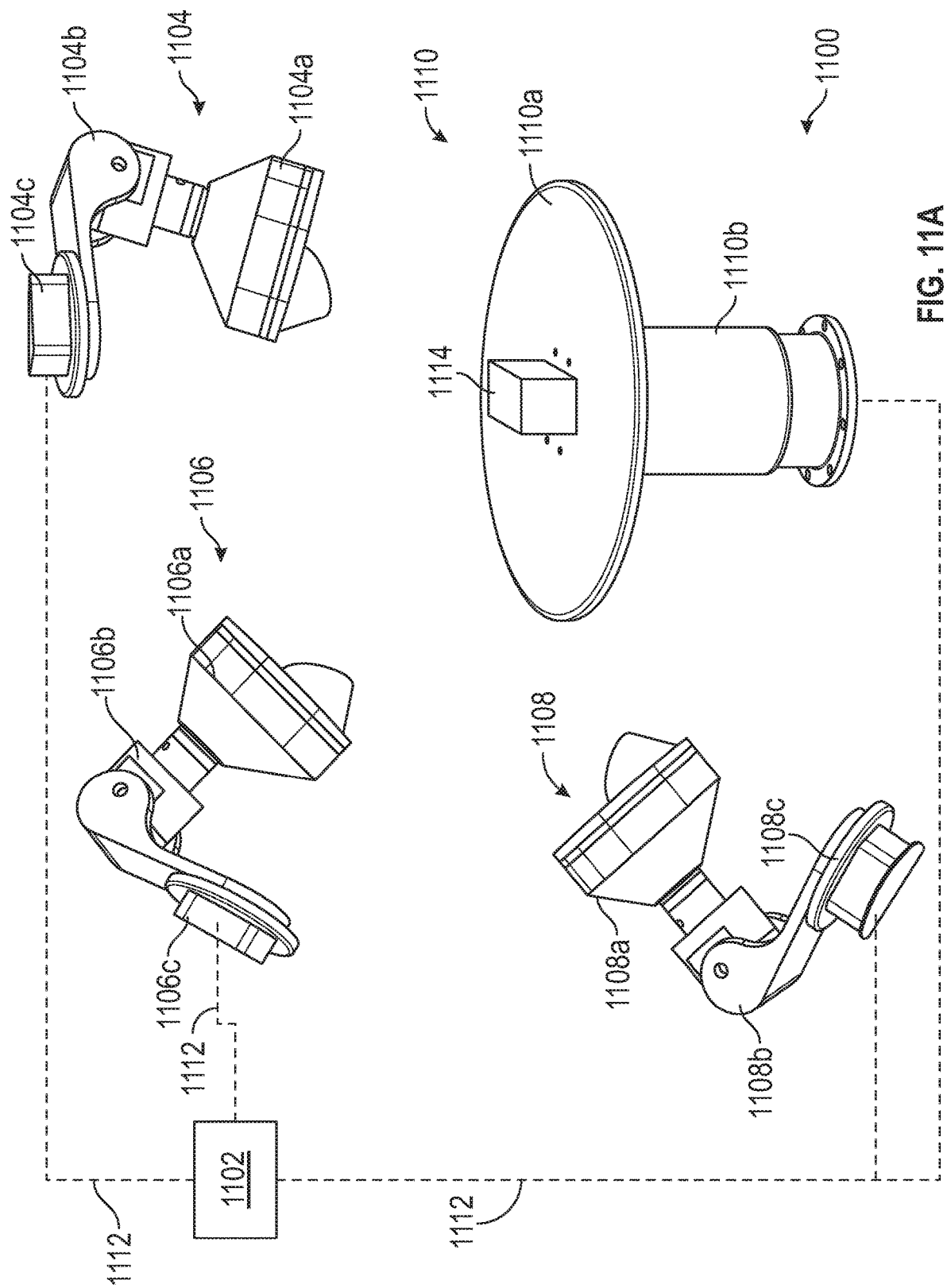
FIG. 11A is a schematic illustration of a coordinate measuring system in accordance with an embodiment of the present disclosure.

Turning now to FIG. 11A, a schematic illustration of a coordinate measuring system 1100 in accordance with an embodiment of the present disclosure is shown. The coordinate measuring system 1100 may include various components that can incorporate one or more motorized cartridges. The coordinate measuring system 1100 includes a control unit 1102 that is operably connected, in this embodiment, to a first coordinate measuring device 1104, a second coordinate measuring device 1106, a third coordinate measuring device 1108, and a fourth coordinate measuring device 1110. The control unit 1102 is configured to control operation of the first, second, third, and fourth coordinate measuring devices 1104, 1106, 1108, 1110 and can transmit and receive information, commands, data, power, etc. therebetween. As shown, the control unit 1102 is connected to or in communication with the coordinate measuring devices 1104, 1106, 1108, 1110 through communications connections 1112.

In this illustrative embodiment, the first coordinate measuring device 1104 includes a first laser line probe 1104a movably mounted on a respective first motorized cartridge 1104b and a respective second motorized cartridge 1104c, such that the first laser line probe 1104a can image or otherwise obtain information associated with a scanned object 1114. The second coordinate measuring device 1106 includes a second laser line probe 1106a movably mounted on a respective first motorized cartridge 1106b and a respective second motorized cartridge 1106c, such that the second laser line probe 1106a can image or otherwise obtain information associated with the scanned object 1114. The third coordinate measuring device 1108 includes a third laser line probe 1108a movably mounted on a respective first motorized cartridge 1108b and a respective second motorized cartridge 1108c, such that the third laser line probe 1108a can image or otherwise obtain information associated with the scanned object 1114. The fourth coordinate measuring device 1110 of this embodiment is a turntable device having a platter 1110a that is mounted to a respective motorized cartridge 1110b that is arranged to drive movement or rotation of the platter 1110a. As shown, the scanned object 1114 is placed on the platter 1110a of the fourth coordinate measuring device 1110. The control unit 1102 can control operation and movement of the coordinate measuring devices 1104, 1106, 1108, 1110 to enable obtaining information associated with the scanned object 1114.

Figure 11B:
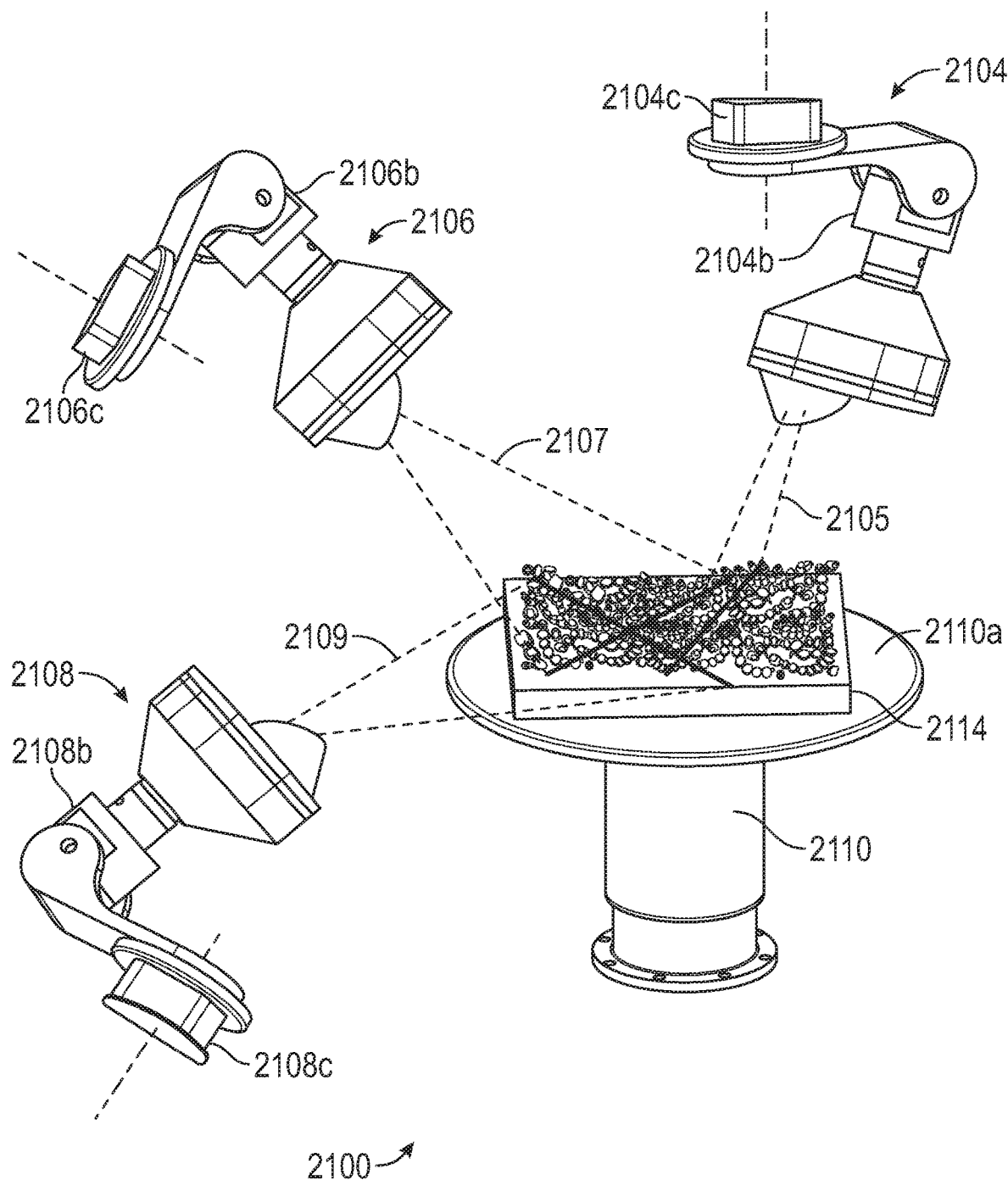
FIG. 11B is a schematic illustration of a coordinate measuring system for a dental restoration inspection in accordance with an embodiment.

Referring now to FIG. 11B is a perspective view of a non-contact 3D measuring system 2100 similar to system 1100 of FIG. 11A except that the 3D measuring devices 1104, 1106, 1108 are replaced by the 3D measuring devices 2104, 2106, 2108. In an embodiment, the 3D measuring devices devices 2104, 2106, 2108 are a triangulation line scanners, sometimes also referred to as a laser line probe (LLP). In an embodiment, the line scanners devices 2104, 2106, 2108 each include a projector that projects a plane of light 2105, 2107, 2109, also referred to as a line of light because the plane of light becomes a line of light when intersecting a dental restoration object 2114. The line scanner includes a camera that captures an image of the line of light 2105, 2107, 2109 that intersects the object 2114. In an embodiment, the line scanners include a motorized cartridge 2104c, 2106c, 2108c that is operable to rotate about axis over angles of rotation. At any given angle of rotation, the line scanners 2104, 2106, 2108 are operable to determine 3D coordinates of points intersected by the line of light 2105, 2107, 2109. Processors within the line scanners 2104, 2106, 2108 may be used to determine the 3D coordinates of the object points intersected by the line of light 2105, 2107, 2109. In an embodiment, the each of the line scanner 2104, 2106, 2108 may include a second motorized cartridge 2104b, 2106b, 2108b that rotates the line scanner about a second axis. The line scanners 2104, 2106, 2109 may be controlled by a control unit (not shown) in the same manner as described in reference to FIG. 11A.

In an embodiment, the line scanners 2104, 2106, 2108 do not include a motorized cartridges 2104b, 2104c, 2106b, 2106c, 2108b, 2108c. Instead the line of light 2105, 2107, 2109 illuminates the object as the rotary stage 2110 is turned. In an embodiment, after the rotary stage 2110 has rotated the object by 2114 by 360 degrees, the 3D measurement procedure is completed. The rotary stage 2110 may be constructed and controlled in the same manner as fourth coordinate measuring device 1110 of FIG. 11A.

Figure 11C:
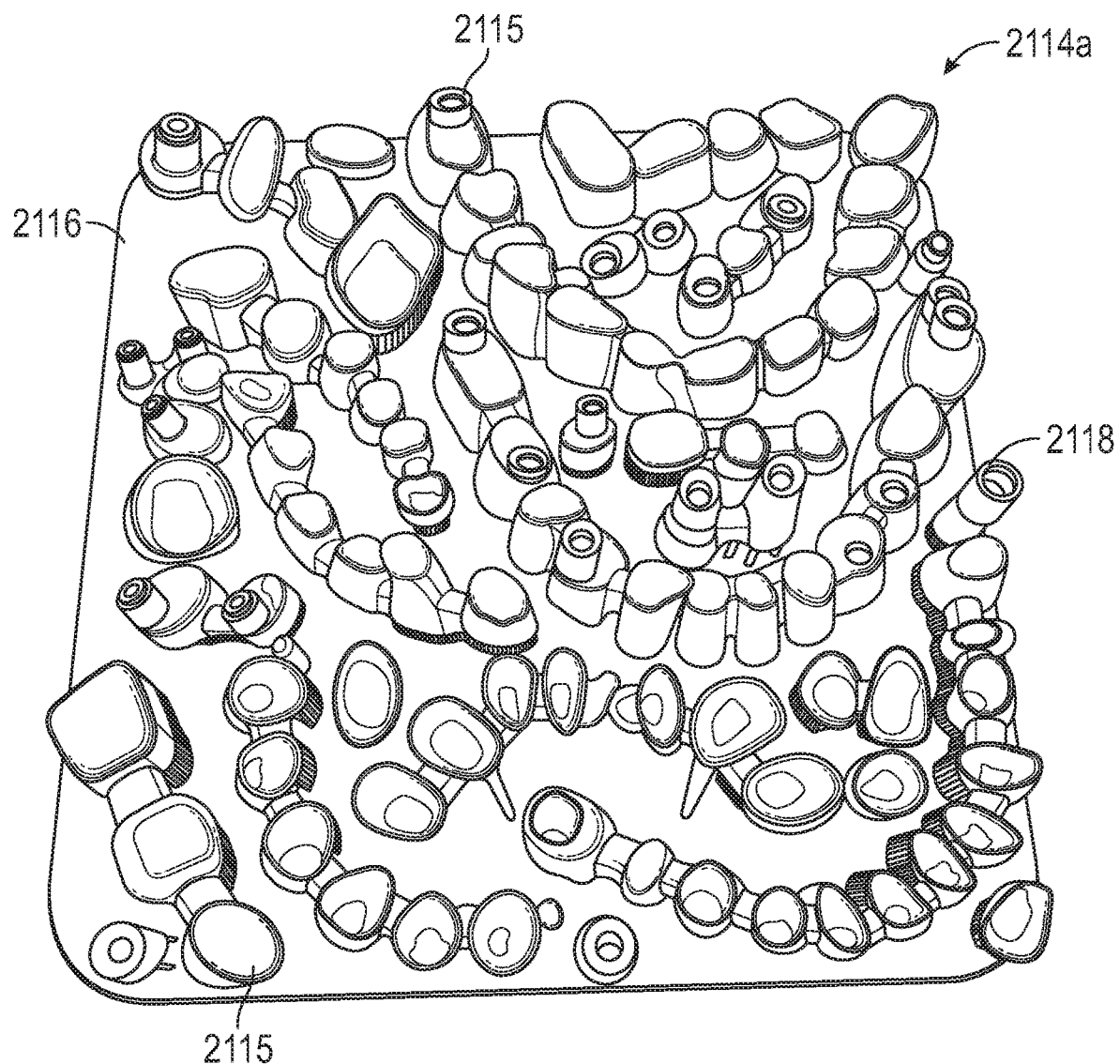
FIG. 11C is a perspective view of a dental restoration plate or melting plate of FIG. 11B manufactured by 3D printing or additive manufacturing in accordance with an embodiment.

FIG. 11C is a perspective view of an object 2114a that, in an embodiment, replaces the object 2114 in FIG. 11B. In an embodiment, the object 2114a is an assembly of 3D printed dental restorations 2115. Examples of dental restorations include a crown, a bridge, and a full arch. In the usual situation, the 3D printed dental restorations are built up in layers using metal or porcelain compounds that are then heated or cured to produce a hard-finished product. This last heating stage is sometimes referred to as the "melt." In the example of FIG. 11C, the dental restorations are built onto a plate 2116 from which they are removed in a final process. In some cases, it is desired that features of the dental restorations have dimensions with a desired precision. An example is a cylindrical recess 2118 designed to accept dental implants. In some cases, the melt portion of 3D manufacture may cause dimensions of the dental restorations 2115 to be altered. It is important, therefore, to verify that features such as cylindrical recesses have the intended dimensions and to mechanically correct such features if the dimensions do not have the desired values. In an embodiment, one method to obtain the desired dimensions is to machine the 3D printed object 2980 as a final step. To position and orient the 3D printed object 2114a in a desired location in a milling machine, a measurement may be made with a noncontact 3D measuring machine 2100. The measuring device may be an area scanner, LLP, or swept beam according to any of the embodiments described herein. In one embodiment, the 3D printed object 2114a is placed in the milling machine and a measurement of the 3D printed object 2114a made with a noncontact 3D measuring device 2100 to register the object 2114a to the frame of reference of the milling machine. In this case, the device 2100 may measure the features of the 3D printed dental restorations 2115 directly or, alternatively, the device 2100 may measure mechanical fiducial features affixed to the object 2114a to enable placing of the 3D printed object 2114a in the frame of reference of the milling machine. In another embodiment, a noncontact 3D measuring device 2100 may be located far removed from the milling machine. In this embodiment, the noncontact 3D measuring device 2100 measures fiducial features on the 3D printed object. The fiducial features on the object 2114a are then mechanically registered to features on the milling machine.

Figure 11D:
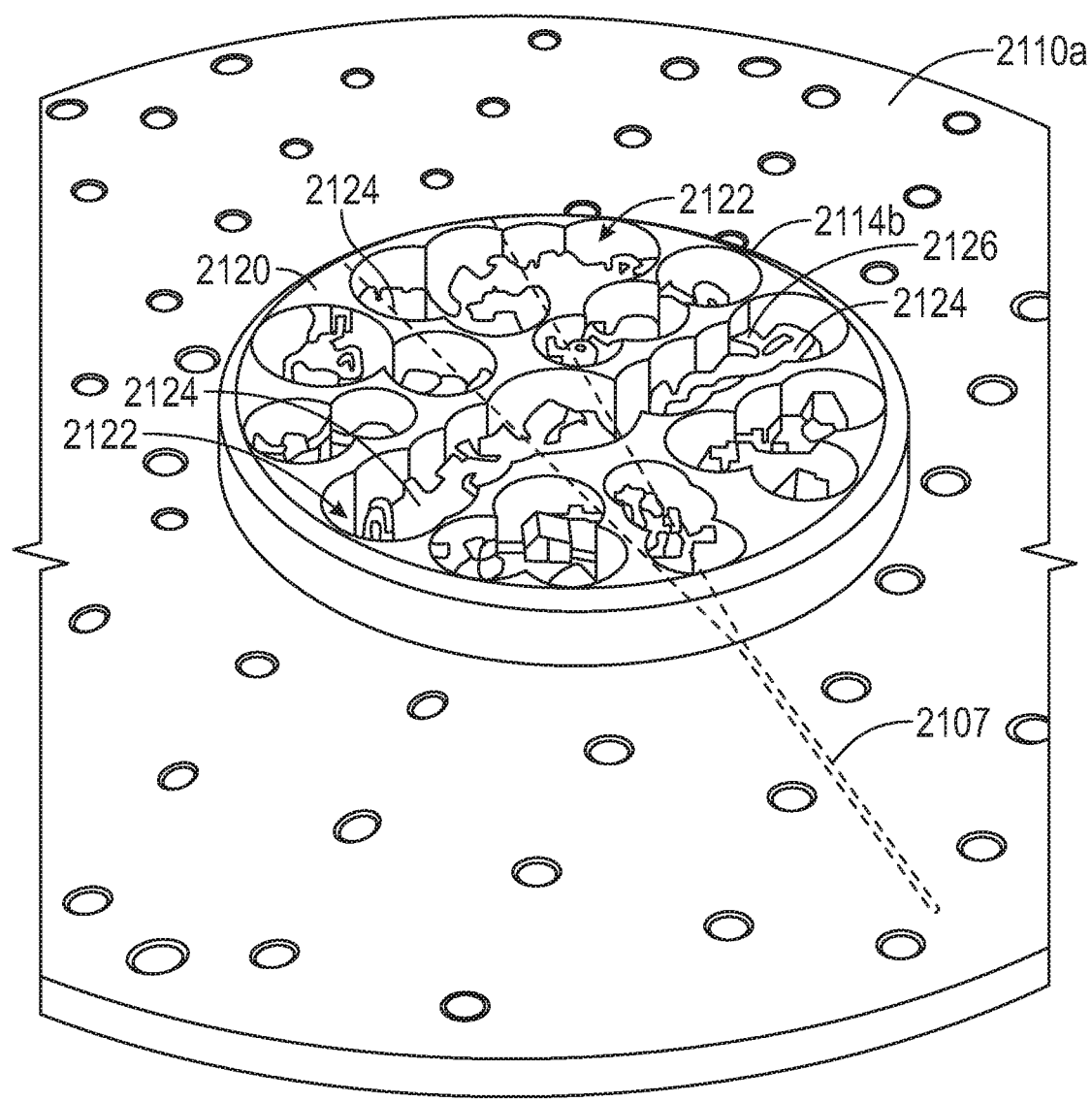
FIG. 11D is an enlarged perspective view of the milling plate for using the system of FIG. 11B in accordance with an embodiment.

FIG. 11D is a perspective view of an object 2114b. In an embodiment, the object 2114b is an assembly of machined dental restorations. In an embodiment, the object 2114b includes a metal disk 2120, a collection of machined cavities 2122, a collection of dental restorations 2124, and a collection of attachments 2126 that affix the machined dental restorations 2124 to the metal disk 2120. In an embodiment, the assembly of machined dental restorations 2114b are produced by a five-axis or six-axis milling machine, enabling the metal disk 2120 to be machined from both sides of the disk. Examples of dental restorations include a crown, a bridge, and a full arch. It is desirable that the completed dental restorations be checked for dimensional accuracy against the CAD models on which the machined parts were based. It is further desirable that such checks of dimensional accuracy be made in an automated basis with a reduced or minimum of operator intervention. In the embodiment illustrated in FIG. 11D, a laser stripe 2107 from an LLP 2106 (FIG. 11B) is used to accurately and quickly determine the dimensions of the dental restorations 2114b. In an embodiment, the laser stripe 2107 measures 3D coordinates of different the dental restorations 2124 as the platen 2110a rotates or as line scanners 2104, 2106, 2106 rotate the laser stripe 2105, 2107, 2109. In some embodiments, the metal disk 2120 is placed on mounting stands. In some cases, the height of the metal disk 2120 on the mounting stands may be sufficient to enable the machined dental restorations 2124 to be measured without being turned over by an operator. In another embodiment, the 3D coordinates of the dental restorations 2124 are measured by an area scanner. In other embodiments, other types of non-contact 3D measuring devices may be used. For example, in an embodiment, a scanners 2104, 2106, 2106, which sweeps a beam of light, is used to measure the 3D coordinates of the dental restorations 2124. In an embodiment, the metal disk 2120 is removed from the milling machine before being measured by one of the non-contact 3D measuring devices described herein above. In other embodiments, a non-contact 3D measuring device measures the dental restorations 2124 before the restorations are removed from the milling machine.

Figure 11E:
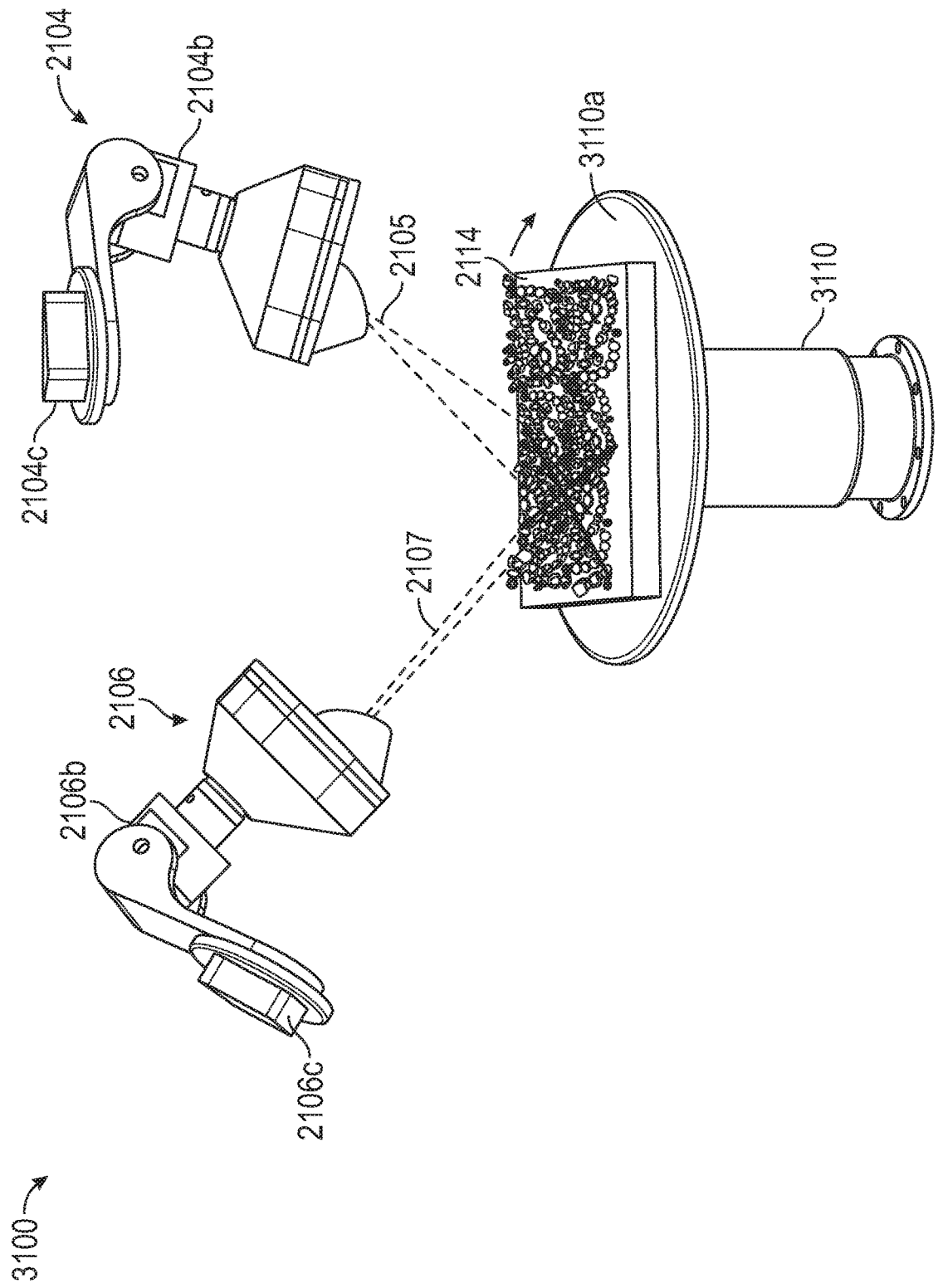
FIG. 11E is a schematic illustration of another coordinate measuring system for a dental restoration inspection, the system having a pair of measurement devices in accordance with an embodiment.
Figure 11F:
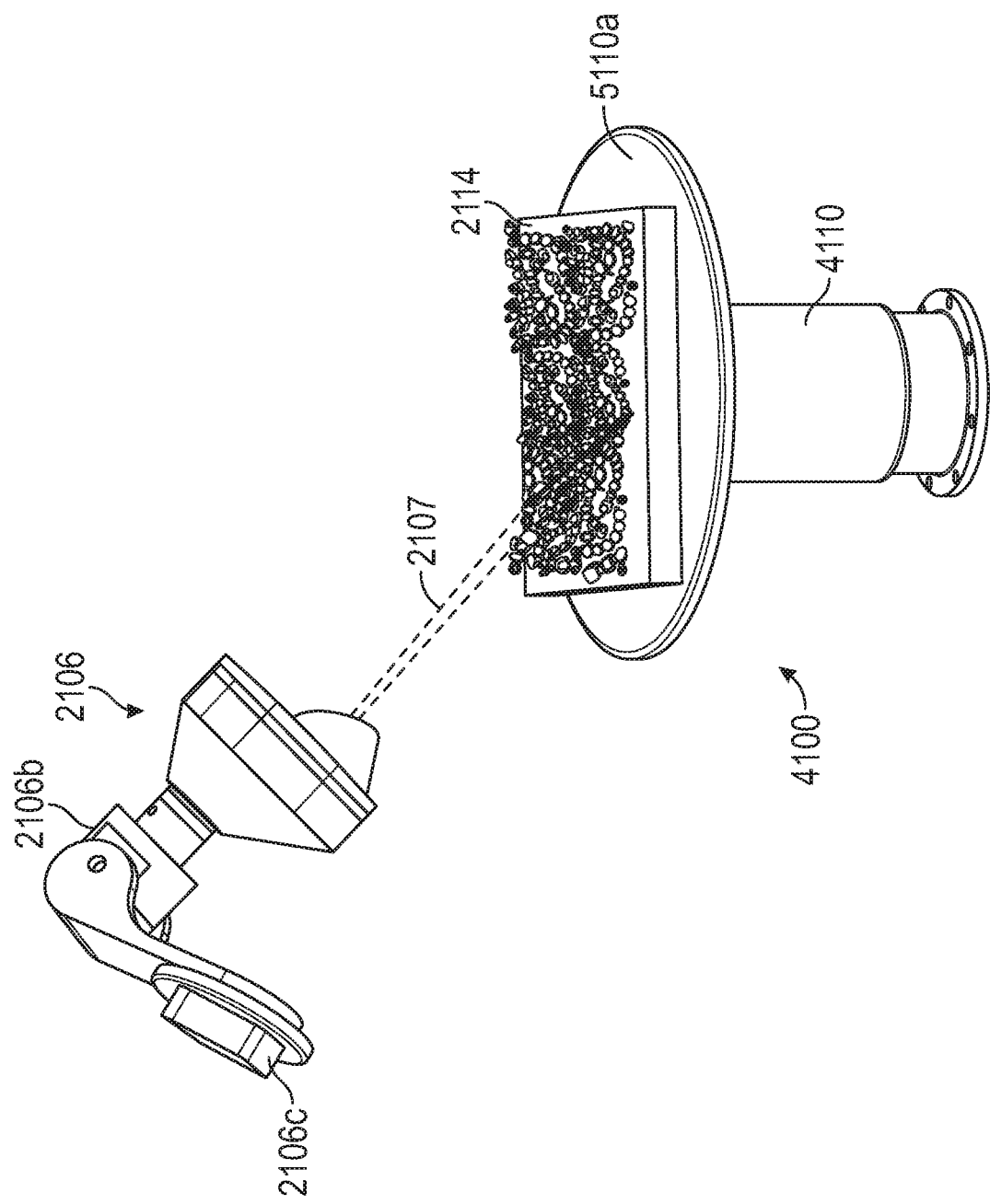
FIG. 11F is a schematic illustration of another coordinate measuring system for a dental restoration inspection, the system having a single measurement device in accordance with an embodiment.

It should be appreciated that the number of scanners 2104, 2106, 2108 used in a non-contact 3D measuring system may be more or less than the number illustrated in FIG. 11B. In another embodiment, shown in FIG. 11E, a non-contact 3D measuring system 3100 includes two scanners 2104, 2106 rather than three scanners. In still another embodiment, a non-contact 3D measuring system 4100 shown in FIG. 11F includes only a single scanner 2106. It should be appreciated that in some embodiments, the rotary stage 1110, 2110, 3110, 4110 may have to rotate more than 360 degrees, with the scanners changing position or orientation to obtain a complete scan (e.g. substantially no occlusions in the scan data) of the dental restorations.

It should be appreciated that while embodiments of FIG. 11A-11F may refer to line scanners, this is for example purposes and the claims should not be so limited. In other embodiments, the scanners may be scanners such as but not limited to triangulation scanners, area scanners, structured line scanners, scanners that sweep a point of light, photogrammetry scanners, or a combination of the foregoing may be used. In still further embodiments, the non-contact 3D measuring system may include multiple types of optical scanners.

Figure 12:
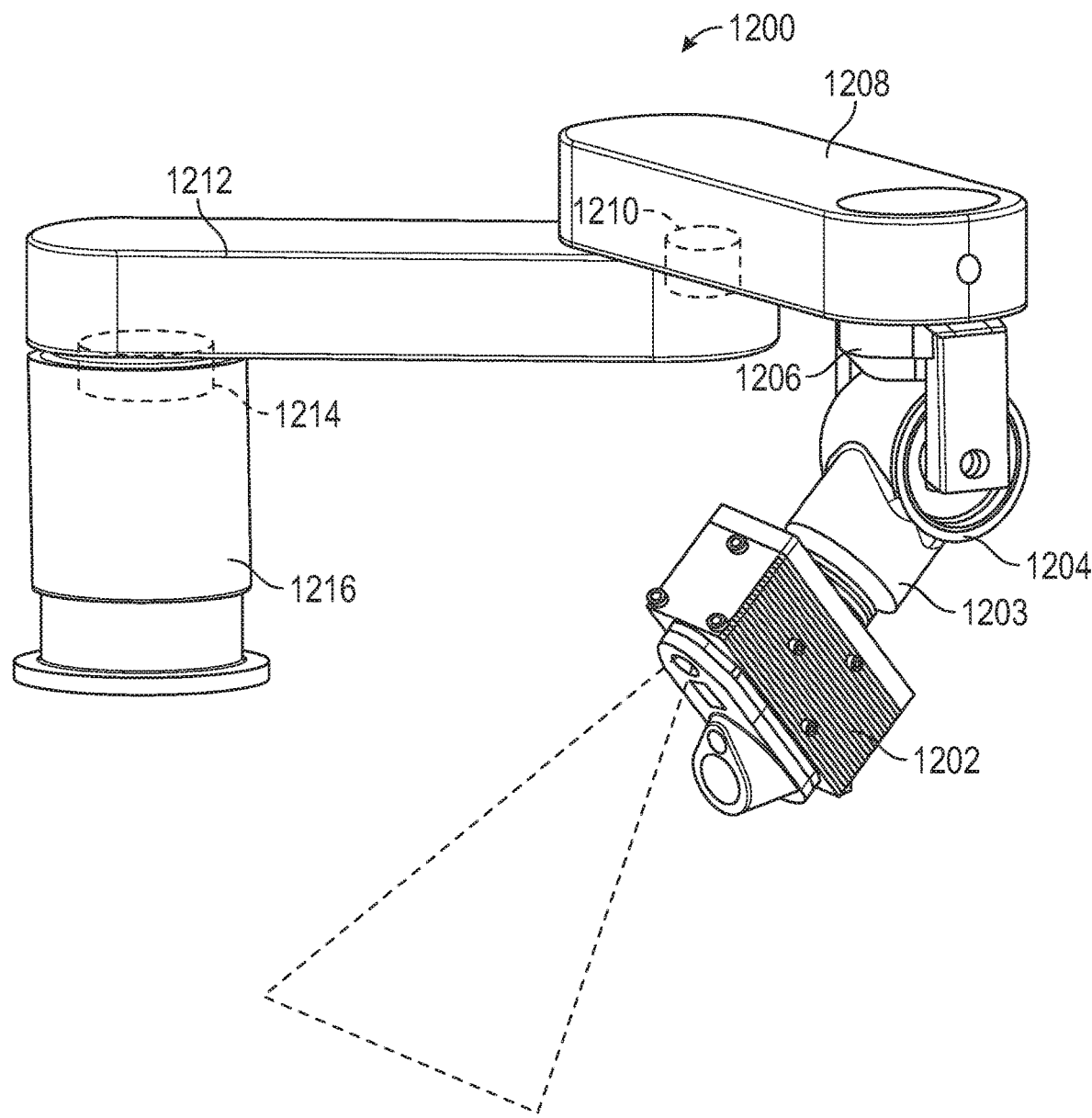
FIG. 12 is a perspective view of a coordinate measurement system in accordance with another embodiment of the present disclosure.

Turning now to FIG. 12, a schematic illustration of a coordinate measuring device 1200 is shown. The coordinate measuring device 1200 is sometimes referred to as a selective compliance assembly robotic arm (SCARA). The coordinate measuring device 1200 includes a laser line probe 1202 movably mounted to a first motorized cartridge 1203. The first cartridge 1203 is coupled to a first arm 1208 by a second motorized cartridge 1204 and a third motorized cartridge 1206. The first arm 1208 couples the cartridges 1204, 1206 to a third motorized cartridge 1210. The first arm 1208 rotates about the axis defined by the cartridge 1210 in a first plane. In this embodiment, the third motorized cartridge 1206 has an axis of rotation that is normal to the first plane. The cartridge 1210 couples the first arm to a second arm 1212. The second arm 1212 is mounted to a motorized cartridge 1214 that is disposed within a base 1216. The second arm 1212 rotates in a second plane that is parallel to the first plane. A communication connection (e.g., an electrical wire) can be fed into and through the various components of the coordinate measuring device 1200 to enable control of the motorized cartridges 1203, 1204, 1206, 1210, 1214 and the laser line probe 1202. Although shown with the laser line probe 1202 attached to the motorized cartridges 1203, 1204, 1206, 1210, 1214 various other attached devices can be used without departing from the scope of the present disclosure.

Figure 13:
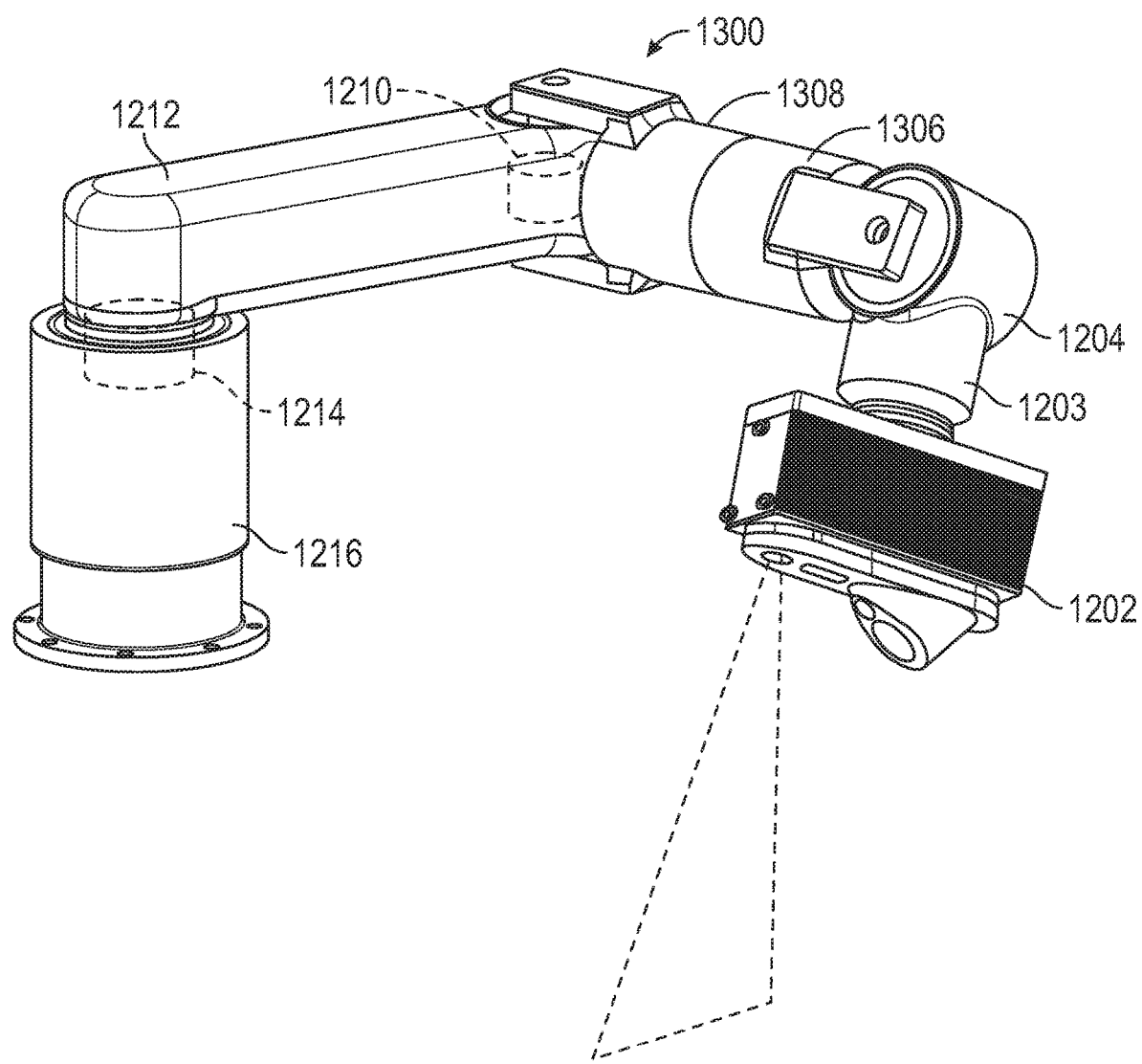
FIG. 13 is a perspective view of a coordinate measurement system in accordance with another embodiment of the present disclosure.

Referring now to FIG. 13, another embodiment of coordinate measurement device 1300 is shown having another SCARA robotic arm. This embodiment is similar to FIG. 12, except that the third motorized cartridge 1306 extends from the end of the first arm 1308. In other words, the axis of rotation of the third motorized cartridge 1306 is coplanar with or parallel to the first plane that the first arm 1308 rotates.

Figure 14:
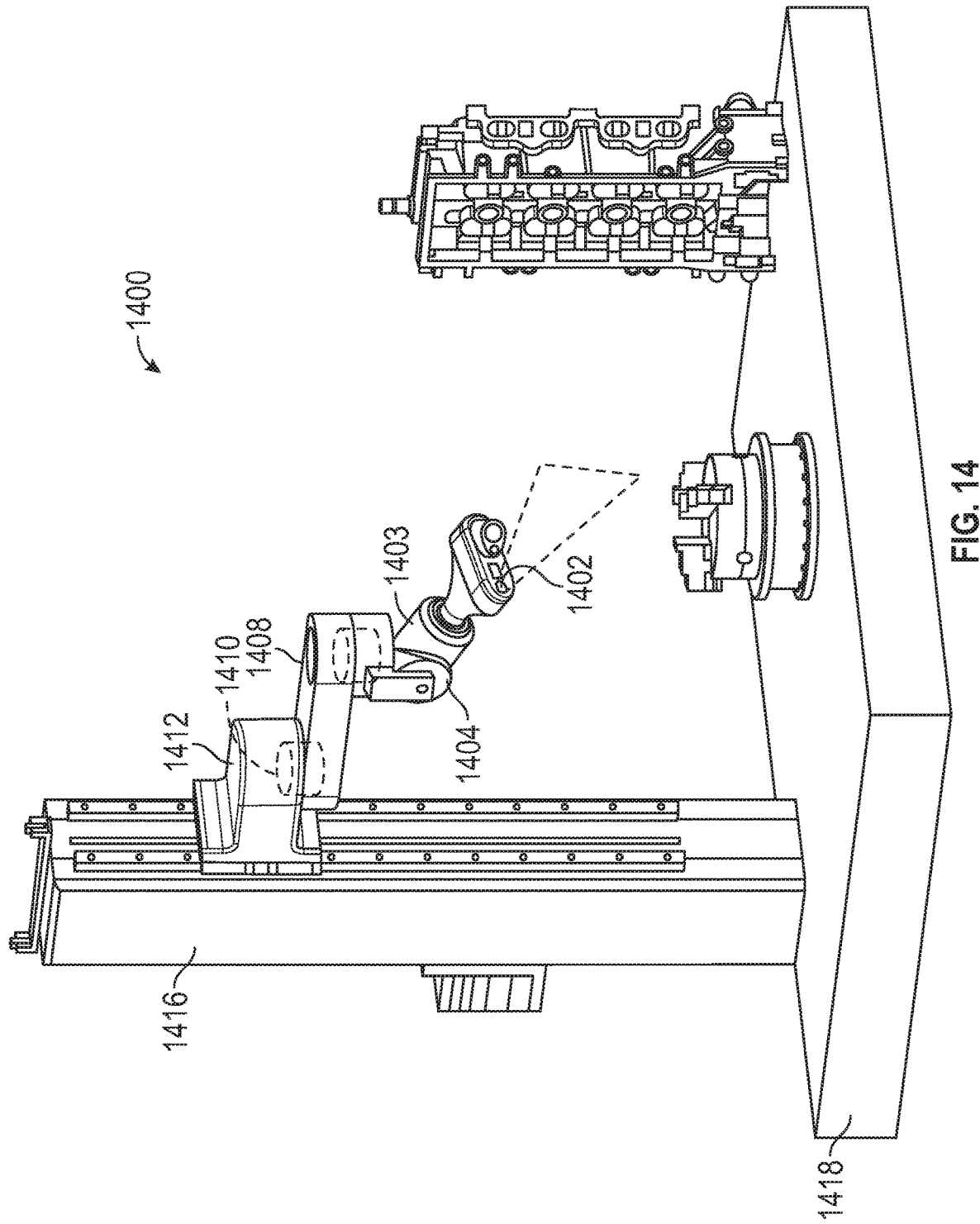
FIG. 14 is a perspective view of a coordinate measurement system in accordance with another embodiment of the present disclosure.

Referring now to FIG. 14, a schematic illustration of a coordinate measuring device 1400 is shown. The coordinate measuring device 1400 also includes a type of SCARA robotic arm. In this embodiment, the coordinate measuring device 1400 includes a laser line probe 1402 movably mounted to a first motorized cartridge 1403. The first cartridge 1403 is coupled to a first arm 1408 by a second motorized cartridge 1404 and a third motorized cartridge 1406. The first arm 1408 couples the cartridges 1404, 1406 to a third motorized cartridge 1410. The first arm 1408 rotates about the axis defined by the cartridge 1410 in a first plane. In this embodiment, the third motorized cartridge 1406 has an axis of rotation that is normal to the first plane. The cartridge 1410 couples the first arm to a second arm 1412. The second arm 1412 is mounted to a linear slide 1416. In an embodiment, the second arm 1412 is movable in a direction normal to the work surface 1418. It should be appreciated that the linear slide 1416 may also be arranged on an angle relative to the work surface 1418. A communication connection (e.g., an electrical wire) can be fed into and through the various components of the coordinate measuring device 1400 to enable control of the motorized cartridges 1403, 1404, 1406, 1410 and the laser line probe 1402. Although shown with the laser line probe 1402 attached to the motorized cartridges 1403, 1404, 1406, 1410, various other attached devices can be used without departing from the scope of the present disclosure.

Figure 15A:
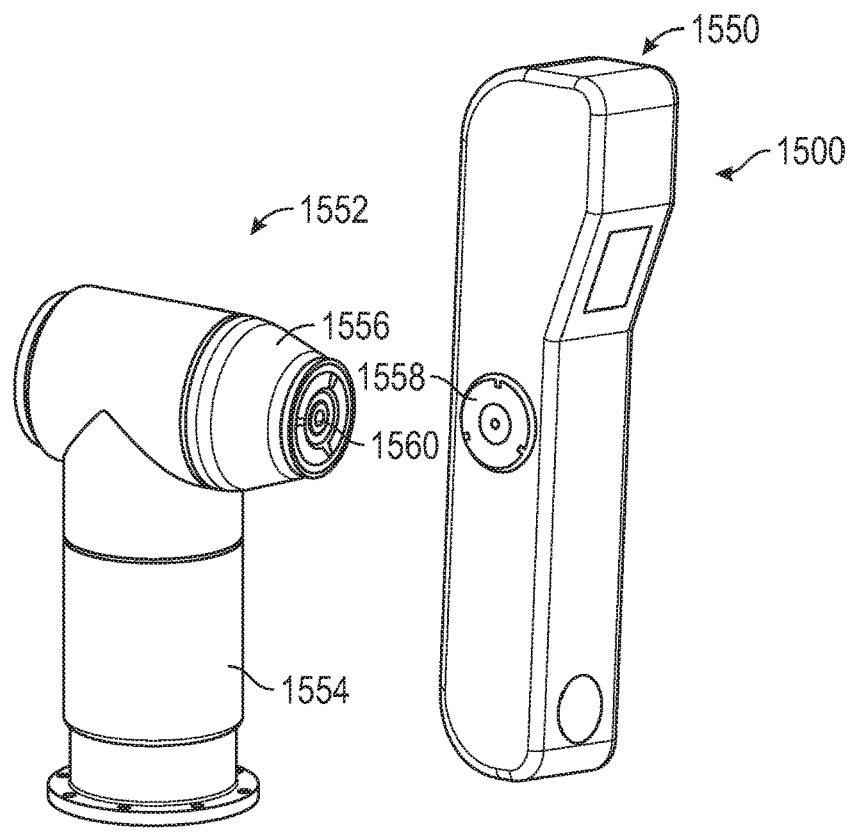
FIG. 15A is a schematic illustration of a coordinate measurement system in accordance with another embodiment of the present disclosure, wherein the parts thereof are separated.
Figure 15B:
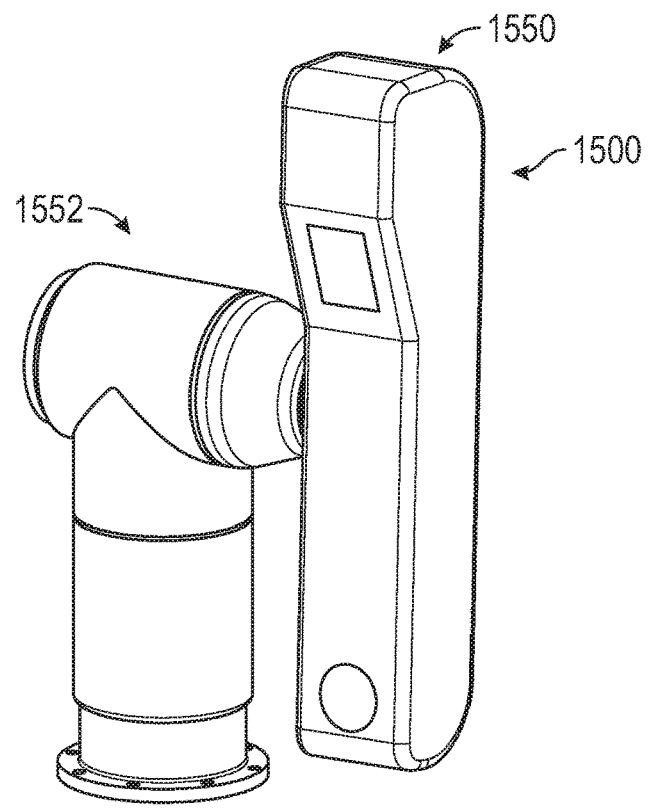
FIG. 15B is a schematic illustration of the coordinate measurement system of FIG. 15A with the parts thereof attached together.

Referring now to FIGS. 15A-15B, schematic illustrations of a coordinate measuring device 1500 is shown. The coordinate measuring device 1500 includes a laser line probe 1550 that is removably and movably mountable to a base 1552. As shown, the laser line probe 1550 is movably mounted to a motorized base 1552 that includes a first cartridge 1554 and a second cartridge 1556. The first and second cartridges 1554, 1556 may be rotatable about axis that are arranged perpendicular to each other (although other angles of orientation are possible without departing from the scope of the present disclosure). A communication connection (e.g., an electrical wire) can be fed into and through the various components of the coordinate measuring device 1500 to enable control of the motorized cartridges 1554, 1556 and the laser line probe 1550. Although shown with the laser line probe 1550 attached to the motorized cartridges 1554, 1556, various other attached devices can be used without departing from the scope of the present disclosure.

The laser line probe 1550, having a first connector 1558, is releasably connectable to the base 1552, having a second connector 1560. FIG. 15A illustrates the laser line probe 1550 separated from the base 1552. FIG. 15B illustrates the laser line probe 1550 connected to the base 1552.

Figure 16:
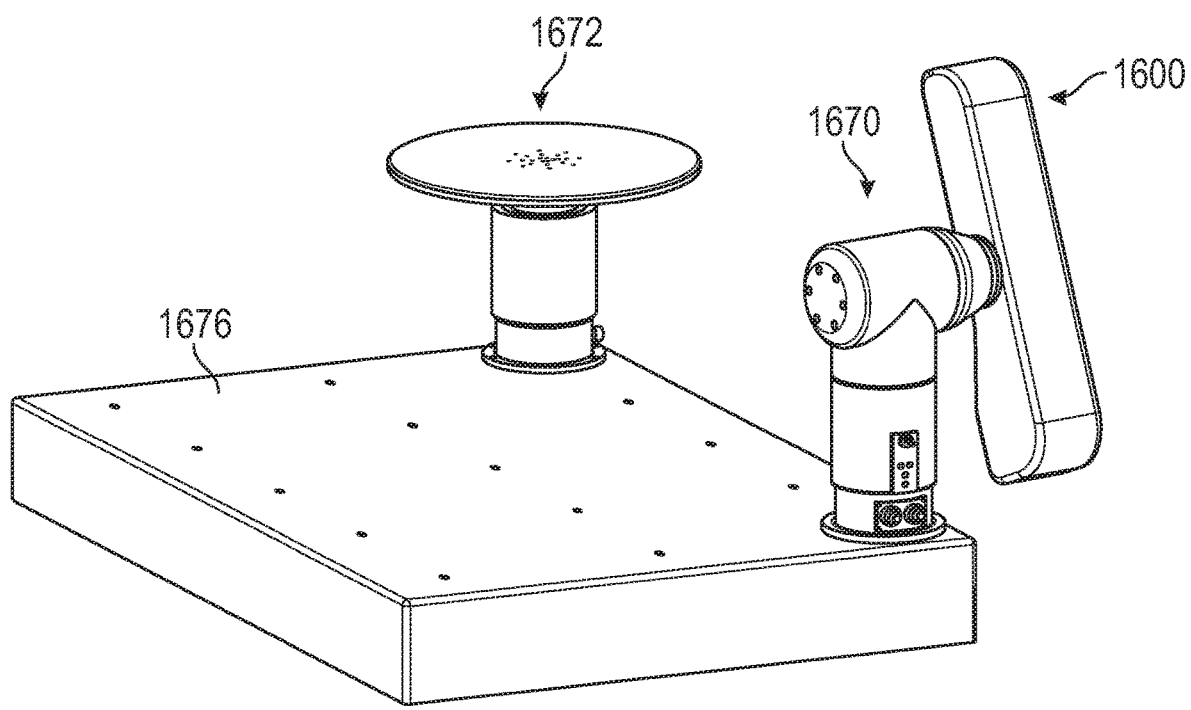
FIG. 16 is a perspective view of a coordinate measurement system in accordance with another embodiment of the present disclosure.

Turning now to FIG. 16, a schematic illustration of a coordinate measuring device 1600. The coordinate measuring device 1600 includes a first device 1670, similar to that shown and described with respect to FIGS. 15A-15B (e.g., a laser line probe mounted to a base), and a second device 1672. The first and second devices 1670, 1672 are mounted to a base 1674. In this embodiment, the first device 1672 may include one or more motorized cartridges of the present disclosure. The second device 1672, illustratively shown as a rotary table, can include one or more motorized cartridges of the present disclosure. Accordingly, multi-axis and remote-axis systems and configurations can employ various embodiments of the present disclosure and particularly incorporate motorized cartridges as shown and described above.

As described herein, the various motorized cartridges are operably connected to a control unit. Such connection, in some embodiments, may enable computer controlled operation and movement, and subsequent measurement by encoders that are part of the cartridges. In some embodiments, when the motors are not used, the cartridges may operate as traditional cartridges (e.g., manually) without being hindered by the inclusion of the motor therein. Further, in some such embodiments, manual operation can enable a learning process to be performed such that a control unit or other control system can learn a manually input or controlled operation. Subsequently, the control unit or control system can control the elements of the system to automatically perform the manually input operation. Such learning can be based on encoder readings during a manual operation, may be based on currents, voltages, or other electrical characteristics within or associated with the motors of the cartridges (e.g., measure current through windings to determine rotation of a shaft).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A motorized cartridge for coordinate measuring machines, the motorized cartridge comprising:
    a cartridge housing having a shaft passing therethrough;
    a measurement probe coupled to shaft and arranged to detect movement of the shaft;
    an integrated motor operably coupled to the shaft and arranged to drive movement of the shaft; and
    a control unit operably connected to the integrated motor and configured to control operation of the integrated motor, wherein the control unit is configured to learn, based at least in part on a manual input, to automatically control operation of the integrated motor based on the learned manual input;
    wherein the learn manual input is based on encoder readings during a manual operation by an operator of at least the measurement probe, the encoder readings being based on at least one of currents, voltages, or other electrical characteristics within or associated with the motorized cartridge.

2. The motorized cartridge of claim 1, wherein the integrated motor is one of a frameless motor, a direct drive motor, and a servo motor.

3. The motorized cartridge of claim 1, wherein the integrated motor is a direct drive frameless motor.

4. The motorized cartridge of claim 1, further comprising a motor housing attached to the cartridge housing, wherein the integrated motor is contained within the motor housing.

5. The motorized cartridge of claim 4, further comprising an adapter contained within the motor housing and connecting the integrated motor to the shaft.

6. The motorized cartridge of claim 5, wherein the adapter is configured to connect to an attached device.

7. The motorized cartridge of claim 6, wherein the attached device is one of a laser line probe, a rotatable platter, and a second cartridge.

8. The motorized cartridge of claim 7, wherein the second cartridge is a motorized cartridge.

9. The motorized cartridge of claim 1, further comprising a bearing assembly located within the cartridge housing, wherein the shaft is movable about the bearing assembly.

10. The motorized cartridge of claim 1, wherein the measurement probe is an optical angular encoder.

11. The motorized cartridge of claim 1, wherein the integrated motor comprises a stator assembly and a rotor assembly.

12. The motorized cartridge of claim 11, wherein the stator assembly is fixedly connected to the shaft.

13. The motorized cartridge of claim 11, wherein the rotor assembly is fixedly connected to the shaft.

14. The motorized cartridge of claim 1, wherein the control unit is located within the cartridge housing.

15. A coordinate measuring system comprising:
    a coordinate measuring device;
    a motorized cartridge having a cartridge housing having a shaft passing therethrough, a measurement probe coupled to shaft and arranged to detect movement of the shaft, and an integrated motor operably coupled to the shaft and arranged to drive movement of the shaft; and
    a control unit operably connected to the integrated motor and configured to control operation of the integrated motor, wherein the control unit is configured to learn manual input to automatically control operation of the integrated motor based on the learned manual input;
    wherein the learned manual input is based on encoder readings during a manual operation of the integrated motor, the encoder readings being based on at least one of currents, voltages, or other electrical characteristics within or associated with the motorized cartridge;
    wherein the coordinate measuring device is mounted to at least one of the cartridge housing and the shaft such that movement of the shaft imparts movement to the coordinate measuring device.

16. The coordinate measuring system of claim 15, wherein the control unit is located within the cartridge housing.

17. The coordinate measuring system of claim 15, wherein the coordinate measuring device is a laser line probe.

18. The coordinate measuring system of claim 15, wherein the coordinate measuring device is a rotatable platter.

19. The coordinate measuring system of claim 15, wherein the motorized cartridge is a first motorized cartridge, the system further comprising a second motorized cartridge.

20. The coordinate measuring system of claim 19, wherein the first motorized cartridge is arranged to drive movement of a first coordinate measuring device and the second motorized cartridge is arranged to drive movement of a second coordinate measuring device.

21. The coordinate measuring system of claim 19, further comprising at least one control unit operably connected to the first motorized cartridge and the second motorized cartridge, the at least one control unit configured to control operation of the first and second motorized cartridges.

22. The coordinate measuring system of claim 21, wherein the at least one control unit is a single control unit operably connected to both the first motorized cartridge and the second motorized cartridge.

23. The coordinate measuring system of claim 21, wherein the first motorized cartridge includes a first control unit and the second motorized cartridge includes a second control unit.

\* \* \* \* \*